(12) United States Patent
Miura et al.

(10) Patent No.: US 9,386,449 B2
(45) Date of Patent: Jul. 5, 2016

(54) DATA COMMUNICATION SYSTEM FOR WORKING MACHINE

(71) Applicant: KUBOTA CORPORATION, Osaka (JP)

(72) Inventors: Keisuke Miura, Sakai (JP); Isao Tanaka, Sakai (JP); Yasuhisa Uoya, Sakai (JP); Takafumi Morishita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 80 days.

(21) Appl. No.: 14/388,457

(22) PCT Filed: Sep. 25, 2013

(86) PCT No.: PCT/JP2013/075841
§ 371 (c)(1),
(2) Date: Sep. 26, 2014

(87) PCT Pub. No.: WO2014/050857
PCT Pub. Date: Apr. 3, 2014

(65) Prior Publication Data
US 2015/0052591 A1 Feb. 19, 2015

(30) Foreign Application Priority Data

Sep. 28, 2012 (JP) .................................. 2012-217782
Sep. 28, 2012 (JP) .................................. 2012-217783

(51) Int. Cl.
*H04L 29/06* (2006.01)
*H04W 12/06* (2009.01)
(Continued)

(52) U.S. Cl.
CPC ............ *H04W 12/06* (2013.01); *A01B 79/005* (2013.01); *G06F 21/34* (2013.01); *G06F 21/44* (2013.01)

(58) Field of Classification Search
CPC . G06F 17/00; H04L 2209/80; H04L 2209/84; H04L 63/105; H04W 12/06; H04W 92/18
See application file for complete search history.

(56) References Cited

U.S. PATENT DOCUMENTS 3,668,651 A * 6/1972 Hornung ................. G06F 13/26
710/3
7,707,409 B2 * 4/2010 Kwon .................... H04W 8/245
380/247

(Continued)

FOREIGN PATENT DOCUMENTS

JP  1999-053674   2/1999
JP  2002-302973   10/2002

(Continued)

OTHER PUBLICATIONS

U.S. Appl. No. 14/388,526 to Keisuke Miura et al., which was filed on Sep. 26, 2014.

(Continued)

*Primary Examiner* — Lisa Lewis
*Assistant Examiner* — Lizbeth Torres-Diaz
(74) *Attorney, Agent, or Firm* — Greenblum & Bernstein, P.L.C.

(57) ABSTRACT

A management server includes a user management database in which mobile terminal identification information on the mobile terminal and working machine identification information on a sold working machine are registered in association with each other, a user registration determination unit adapted to determine whether or not the mobile terminal and the working machine are registered in association with each other on the basis of the mobile terminal identification information and the working machine identification information outputted from the mobile terminal and the mobile terminal identification information and the working machine identification information stored in the user management database, and an authorization information output unit adapted to output an authorization key necessary for wireless communication between the mobile terminal and the working machine in the case where the user registration determination unit determines that the mobile terminal and the working machine are registered in association with each other.

22 Claims, 16 Drawing Sheets

(51) Int. Cl.
  *G06F 21/44* (2013.01)
  *G06F 21/34* (2013.01)
  *A01B 79/00* (2006.01)

(56) References Cited

U.S. PATENT DOCUMENTS

| | | | |
|---|---|---|---|
| 8,854,183 B2* | 10/2014 | Komine | G05B 19/0428 340/10.1 |
| 2006/0009906 A1* | 1/2006 | Hellmich | G01C 21/26 701/532 |
| 2007/0274576 A1* | 11/2007 | Morita | B60R 25/1004 382/125 |
| 2008/0150677 A1* | 6/2008 | Arakawa | B60R 25/2018 340/5.2 |
| 2012/0095642 A1* | 4/2012 | Nishida | H04L 9/3226 701/31.4 |
| 2013/0028224 A1* | 1/2013 | Chen | H04W 76/02 370/329 |
| 2013/0151359 A1* | 6/2013 | Fujisawa | G06Q 20/204 705/17 |

FOREIGN PATENT DOCUMENTS

| | | |
|---|---|---|
| JP | 2002-364024 | 12/2002 |
| JP | 2005-323070 | 11/2005 |
| JP | 2009-064231 | 3/2009 |

OTHER PUBLICATIONS

Search report from International Bureau of WIPOin PCT/JP2013/075841, mail date is Nov. 26, 2013.

* cited by examiner

Fig.3

| Working machine identification information (stored working machine information) ||||| Mobile terminal identification information (Stored mobile information) | User identification information |||||
|---|---|---|---|---|---|---|---|---|---|
| Tractor information || Control device information | Data communication device | | | | | | |
| Serial number | Model | Serial number | Serial number | Phone number | User name | Address | User ID | Password |
| 10012 | M115A | TS-115-118 | NKJ-305665892 | 012-3456-7890 | A.K | Hokkaido | ****248 | *****11 |
| 10001 | M135A | TS-135-119 | NKJ-305665893 | 012-5149-1593 | Y.S | Niigata prefecture | ****df2 | *****35 |
| 10002 | M135A | TS-135-123 | | 012-1863-5581 | S.T | Nagano prefecture | ****bop | *****32 |
| 10013 | M115A | TS-115-121 | NKJ-305665895 | 012-9354-2973 | M.H | Fukushima prefecture | ****fgg | *****81 |
| 10003 | M135A | TS-135-122 | | 012-3954-8214 | K.R | Shiga prefecture | ****485 | *****69 |
| 10006 | M135A | TS-135-120 | NKJ-305665897 | 012-9472-2551 | I.K | Mie prefecture | ****tyi | *****46 |
| ... | ... | ... | ... | ... | ... | ... | ... | ... |
| 10055 | M115A | TS-115-123 | NKJ-305665897 | 012-2515-4252 | T.S | Kochi prefecture | ****rt1 | *****16 |

| Machine management code | Working machine identification information | | | | |
|---|---|---|---|---|---|
| | Tractor information | | Control device information | Data communication device | |
| | Unit number | Model | Serial number | Serial number | |
| ****-250 | 10012 | M115A | TS-115-118 | NKJ-305665892 | |
| ****-251 | 10001 | M135A | TS-135-119 | NKJ-305665893 | |
| ****-252 | 10002 | M135A | TS-135-123 | | |
| ****-253 | 10013 | M115A | TS-115-121 | NKJ-305665895 | |
| ****-254 | 10003 | M135A | TS-135-122 | | |
| ****-255 | 10006 | M135A | TS-135-120 | NKJ-305665897 | |
| ... | ... | ... | ... | ... | |
| ****-800 | 10055 | M115A | TS-115-123 | NKJ-305665897 | |

(b)

| User management code | Mobile terminal identification information | User identification information | | | | Authorization key | |
|---|---|---|---|---|---|---|---|
| | Phone number | Name | Address | User-ID | Password | First | Second |
| U*********489 | 012-3456-7890 | A.K | Hokkaido | ****248 | *****11 | ******478 | *****285 |
| U*********490 | 012-5149-1593 | Y.S | Niigata prefecture | ****df2 | *****35 | ******479 | *****286 |
| U*********491 | 012-1863-5581 | S.T | Nagano prefecture | ****bop | *****32 | ******480 | *****287 |
| U*********492 | 012-9354-2973 | M.H | Fukushima prefecture | ****fgg | *****81 | ******481 | *****288 |
| U*********493 | 012-3954-8214 | K.R | Shiga prefecture | ****485 | *****69 | ******482 | *****289 |
| U*********494 | 012-9472-2551 | I.K | Mie prefecture | ****tyi | *****46 | ******483 | *****290 |
| ... | ... | ... | ... | ... | ... | ... | ... |
| U*********522 | 012-2515-4252 | T.S | Kochi prefecture | ****rt1 | *****16 | ****999 | ****300 |

(c)

| Machine management code | User management code | | | | |
|---|---|---|---|---|---|
| ****-250 | U*******489 | U*****490 | U*****491 | U*****492 | U*******493 |
| ****-251 | 10012··A.K.. | ··· | ··· | ··· | ··· |
| ****-252 | | 10001··Y.S.. | 10002··S.T.. | ··· | ··· |
| ****-253 | | | | 10013··M.H.. | ··· |
| ****-254 | | | | | 10003··K.R.. |
| ****-255 | | | | | |
| ... | ... | ... | ... | ... | ... |

Fig.10

| Machine management code | User management code | 2012.9.15 Data | 2012.9.16 Data | 2012.10.10 Data | ... |
|---|---|---|---|---|---|
| *****-250 | U*********489 | Harvest amount 2.0, Protein 6.0 | — | — | ... |
| *****-251 | U*********490 | — | Harvest amount 8.3, Protein 6.5 | — | ... |
| *****-252 | U*********491 | — | — | ... | ... |
| *****-253 | U*********492 | — | ... | — | ... |
| *****-254 | U*********493 | — | — | — | ... |
| *****-255 | U*********494 | — | ... | Added fertilizer 5.5 | ... |
| ... | ... | | | | |
| *****-800 | U*********522 | — | — | ... | ... |

| Tractor information | Working machine identification information | | | Mobile terminal identification information | User identification information | | | |
|---|---|---|---|---|---|---|---|---|
| Serial number | Model | Control device information Serial number | Data communication device Serial number | Phone number | name | Address | User ID | Password |
| 10012 | M115A | TS-115-118 | NKJ-305665892 | 012-3456-7890 | A.K | Hokkaido | ****248 | *****11 |
| 10001 | M135A | TS-135-119 | NKJ-305665893 | 012-5149-1593 | Y.S | Niigata prefecture | ****df2 | *****35 |
| 10002 | M135A | TS-135-123 | | 012-1863-5581 | S.T | Nagano prefecture | ****bop | *****32 |
| 10013 | M115A | TS-115-121 | NKJ-305665895 | 012-9354-2973 | M.H | Fukushima prefecture | ****fgg | *****81 |
| 10003 | M135A | TS-135-122 | | 012-3954-8214 | K.R | Shiga prefecture | ****485 | *****69 |
| 10006 | M135A | TS-135-120 | NKJ-305665897 | 012-9472-2551 | I.K | Mie prefecture | ****tyi | *****46 |
| ... | ... | ... | ... | ... | ... | ... | ... | ... |
| 10055 | M115A | TS-115-123 | NKJ-305665897 | 012-2515-4252 | T.S | Kochi prefecture | ****rt1 | *****16 |

(b)

| Tractor information | Working machine identification information | | | Mobile terminal identification information | User identification information | | | |
|---|---|---|---|---|---|---|---|---|
| Serial number | Model | Control device information Serial number | Data communication device Serial number | Phone number | name | Address | User ID | Password |
| 10012 | M115A | TS-115-118 | NKJ-305665892 | 012-3456-7890 | A.K | Hokkaido | ****248 | *****11 |
| 10001 | M135A | TS-135-119 | NKJ-305665893 | 012-5149-1593 | Y.S | Niigata prefecture | ****df2 | *****35 |
| 10002 | M135A | TS-135-123 | | 012-1863-5581 | S.T | Nagano prefecture | ****bop | *****32 |
| 10013 | M115A | TS-115-121 | NKJ-305665895 | 012-9354-2973 | M.H | Fukushima prefecture | ****fgg | *****81 |
| 10003 | M135A | TS-135-122 | | 012-3954-8214 | K.R | Shiga prefecture | ****485 | *****69 |
| 10006 | M135A | TS-135-120 | | 012-9472-2551 | I.K | Mie prefecture | ****tyi | *****46 |
| ... | ... | ... | ... | ... | ... | ... | ... | ... |
| 10055 | M115A | TS-115-123 | NKJ-305665897 | | T.S | Kochi prefecture | ****rt1 | *****16 |

| Working machine identification information | | | | Mobile terminal identification information | User identification information | | | |
|---|---|---|---|---|---|---|---|---|
| Tractor information | | Control device information | Data communication device | | | | | |
| Serial number | Model | Serial number | Serial number | Phone number | name | Address | User ID | Password |
| 10012 | M115A | TS-115-118 | NKJ-305665892 | 012-3456-7890 | A.K | Hokkaido | ***248 | *****11 |
| 10001 | M135A | TS-135-119 | NKJ-305665893 | 012-5149-1593 | Y.S | Niigata prefecture | ****df2 | *****35 |
| 10002 | M135A | TS-135-123 |  | 012-1863-5581 | S.T | Nagano prefecture | ***bop | *****32 |
| 10013 | M115A | TS-115-121 | NKJ-305665895 | 012-9354-2973 | M.H | Fukushima prefecture | ****fgg | *****81 |
| 10003 | M135A | TS-135-122 |  | 012-3954-8214 | K.R | Shiga prefecture | ***485 | *****69 |
| 10006 | M135A | TS-135-120 |  | 012-9472-2551 | I.K | Mie prefecture | ****tyi | *****46 |
| ... | ... | ... | ... | ... | ... | ... | ... | ... |
| 10055 | M115A | TS-115-123 | NKJ-305665897 | 012-2515-4252 | T.S | Kochi prefecture | ****rt1 | *****16 |

(b)

| Working machine identification information | | | | Mobile terminal identification information | User identification information | | | |
|---|---|---|---|---|---|---|---|---|
| Tractor information | | Control device information | Data communication device | | | | | |
| Serial number | Model | Serial number | Serial number | Phone number | name | Address | User ID | Password |
| 10012 | M115A | TS-115-118 | NKJ-305665892 | 012-3456-7890 | A.K | Hokkaido | ***248 | *****11 |
| 10001 | M135A | TS-135-119 | NKJ-305665893 | 012-5149-1593 | Y.S | Niigata prefecture | ****df2 | *****35 |
| 10002 | M135A | TS-135-123 |  | 012-1863-5581 | S.T | Nagano prefecture | ***bop | *****32 |
| 10013 | M115A | TS-115-121 | NKJ-305665895 | 012-9354-2973 | M.H | Fukushima prefecture | ****fgg | *****81 |
| 10003 | M135A | TS-135-122 |  | 012-3954-8214 | K.R | Shiga prefecture | ***485 | *****69 |
| 10006 | M135A | TS-135-120 |  | 012-9472-2551 | I.K | Mie prefecture | ****tyi | *****46 |
|  |  |  |  | 012-9472-3000 |  |  |  |  |
| ... | ... | ... | ... | ... | ... | ... | ... | ... |
| 10055 | M115A | TS-115-123 | NKJ-305665897 | 012-2515-4252 | T.S | Kochi prefecture | ****rt1 | *****16 |

DATA COMMUNICATION SYSTEM FOR WORKING MACHINE

TECHNICAL FIELD

The present invention relates to a data communication system for a working machine for transmitting data on a working machine to a mobile terminal.

BACKGROUND ART

For working machines such as tractors and combine harvesters and working machines such as construction machines including backhoes, there is a demand for obtaining information on the operation of the working machines by using equipment such as mobile terminals. Further, in recent years, to increase the efficiency of work plans in agricultural fields and improve the quality of crops harvested in agricultural fields, a demand for collecting and utilizing data on agricultural fields, for example, work contents in the agricultural fields, has increased.

As a technique of obtaining operational information of working machines, Patent Literature 1 discloses a technique of obtaining work information on agricultural tasks of working machines. Patent Literature 2 discloses a technique of collecting data and storing the data in a database or the like.

In Patent Literature 1, a crop harvest machine includes crop quality measurement means adapted to measure the quality of harvested crops, and information output means adapted to output quality measurement information measured by the crop quality measurement means to the outside of the machine, and there are provided measurement information collection means adapted to collect the quality measurement information outputted from the information output means for each of a plurality of harvest places, and quality map generation means adapted to determine and output a crop quality map for each of regions corresponding to the harvest places, on the basis of the information collected by the measurement information collection means.

In Patent Literature 2, agricultural tasks are performed after storing process information including at least work processes for producing crops, execution dates and execution time of each work process, work interval between the work processes, and making a work plan preliminary designed and suggested to produce the crops, and then, actual work performances are stored in a database or the like.

CITATION LIST

Patent Literature

Patent Literature 1: Japanese Unexamined Patent Publication JP-A 11-053674
Patent Literature 2: JP-A 2009-64231

SUMMARY OF INVENTION

Technical Problem

In Patent Literature 1, the information output means configured of a wireless communication device merely outputs the measurement information to the outside of the machine, and any communication equipment (for example, mobile terminal) can obtain the measurement information from the crop harvest machine. With the configuration in which the measurement information is merely outputted to the outside of the machine as described in Patent Literature 1, the communication equipment can easily obtain the measurement information from the crop harvest machine, but data can be transmitted without limitation, possibly lowering the reliability of the obtained measurement information.

In Patent Literature 2, the work performances of the agricultural tasks can be stored in the database and, the database stores personal information on workers who perform agricultural tasks. In Patent Literature 1, the database mainly serves to store the work performances, and the confidentiality of the personal information stored in the database is poor. In addition, since the machine that performs the agricultural tasks is not related to the work performances in the database, for example, in making a work plan, the machine that performs the agricultural tasks is not incorporated into the work plan.

Thus, in consideration of the above-mentioned problems, an object of the present invention is to provide a data communication system for working machine that can easily transmit data obtained by a data communication device to a mobile terminal as well as ensure the reliability of the data. The other object is to provide a data communication system for working machine that can ensure the confidentiality of information in a user management database in which at least a mobile terminal of the user and a working machine sold to the user are registered to be related to each other.

Solution to Problem

To attain the objects, the present invention takes following measures. That is, a data communication system according to a first aspect of the present invention includes a data communication system for a working machine, the data communication system including: a data communication device configured to obtain data relating to the working machine; a mobile terminal configured to receive the data of the data communication device by wireless communication; and a management server configured to output an authorization key for wireless communication between the data communication device and the mobile terminal, wherein the mobile terminal includes: an information output unit configured to output, to the management server, a mobile terminal identification information and a working machine identification information, the mobile terminal identification information identifying the mobile terminal, the working machine identification information identifying the working machine; and an authorization key output unit configured to output, to the data communication device, the authorization key outputted from the management server, the management server includes: a user management database configured to register the mobile terminal identification information relating to the mobile terminal and the working machine identification information relating to a sold working machine and to relate the mobile terminal identification information and the working machine identification information to each other; a user registration determination unit configured to determine whether or not the mobile terminal and the working machine are registered to be related to each other on the basis of the mobile terminal identification information and the working machine identification information each outputted from the mobile terminal and of the mobile terminal identification information and the working machine identification information each stored in the user management database; and an authorization information output unit configured to output the authorization key necessary for wireless communication between the mobile terminal and the working machine when the user registration determination unit determines that the mobile terminal and the working machine are registered to be related to each other, and the data communication device includes a communication authorization unit configured to authenticate the authorization key outputted from the mobile terminal with an authorization key previously stored in the communication authorization unit to determine validation of the authorization key outputted from the mobile terminal, and to authorize wireless communication between the data communication device and the mobile terminal when determining validation of the authorization key outputted from the mobile terminal.

In the data communication system according to a second aspect of the present invention, the management server includes a registration unit configured to register, in the user management database, the mobile terminal identification information and the working machine identification information each outputted from the mobile terminal, to relate the mobile terminal identification information and the working machine identification information to each other, and to issue the authorization key, and the user registration determination unit determines, upon issue of the authorization key from the registration unit, that the mobile terminal and the working machine corresponding to the authorization key are registered to be related to each other.

In the data communication system according to a third aspect of the present invention, the registration unit registers the outputted working machine identification information in addition to the mobile terminal identification information in a case where: the mobile terminal identification information outputted from the mobile terminal is already registered in the user management database; and the working machine identification information outputted from the mobile terminal is not registered, in the user management database, not to be related to the mobile terminal identification information outputted from the mobile terminal.

In the data communication system according to a fourth aspect of the present invention, the registration unit registers the outputted mobile terminal identification information in addition to the working machine identification information in a case where: the working machine identification information outputted from the mobile terminal is registered in the user management database; and the mobile terminal identification information outputted from the mobile terminal is not registered to be related to the working machine identification information outputted from the mobile terminal in the user management database.

In the data communication system according to a fifth aspect of the present invention, the mobile terminal includes a machine information request unit configured to request the working machine identification information to the data communication device, and the information output unit outputs, after obtaining the working machine identification information, the working machine identification information and the mobile terminal identification information to the management server on the basis of the request from the machine information request unit.

In the data communication system according to a sixth aspect of the present invention, the machine information request unit requests the working machine identification information to the data communication device after: transmission of a network key from the mobile terminal to the data communication device; and establishment of the authentication for wireless communication between the mobile terminal and the data communication device on the basis of the network key.

A data communication system according to a seventh aspect of the present invention is a data communication system for a working machine including: a data communication device configured to obtain data relating to the working machine; a mobile terminal configured to receive the data of the data communication device by wireless communication; a first management server configured to include a user management database, the user management database registering and relating the mobile terminal of a user and the working machine sold to the user each other; and a second management server configured to include a working machine information database, the working machine information database obtaining the data obtained by the data communication device via the mobile terminal and storing the obtained data, wherein the first management server outputs, to the second management server, a first authorization key for determining whether or not wireless communication between the data communication device and the mobile terminal is performed, and outputs, to the second management server, a second authorization key for determining whether or not the mobile terminal is connected to the working machine information database in a case where the mobile terminal owned by the user is related to the working machine owned by the user in the user management database, and the second management server outputs the first authorization key to the mobile terminal, the first authorization key being received from the first management server, and outputs the second authorization key to the mobile terminal, the second authorization key being received from the first management server.

In the data communication system according to an eighth aspect of the present invention, the user management database stores a user management code for management of the user and a machine management code for management of at least the working machine and relates the user management code and the machine management code to the mobile terminal and the working machine, and the mobile terminal outputs data obtained from the data communication device, the user management code, and the machine management code to the working machine information database after connecting to the working machine information database on the basis of the second authorization key.

In the data communication system according to a ninth aspect of the present invention, the user management database has a management data table for extracting relation at least between the working machine and the mobile terminal on the basis of the user management code and the machine management code.

In the data communication system according to a tenth aspect of the present invention, the mobile terminal transmits a physical address on a network, the physical address being assigned to the mobile terminal as the user management code, to the user management database via the first management server, and the data communication device transmits a physical address on a network, the physical address being assigned to the data communication device as the machine management code, to the user management database via the mobile terminal and the first management server.

In the data communication system according to an eleventh aspect of the present invention, the mobile terminal includes an authorization key output unit configured to output the first authorization key to the data communication device, and the data communication device includes a communication authorization unit configured to authenticate the first authorization key outputted from the mobile terminal with the first authorization key previously stored in the data communication device to determine validation of the first authorization key outputted from the mobile terminal, and transmits the data between the data communication device and the mobile terminal when determining validation of the first authorization key outputted from the mobile terminal.

In the data communication system according to a twelfth aspect of the present invention, the mobile terminal transmits the second authorization key to the first management server, and the first management server receives the second authorization key transmitted from the mobile terminal, determines whether or not the second authorization key corresponding to the mobile terminal is stored, and authorizes the mobile terminal to access the working machine information database when it is determined that the second authorization key is stored.

Advantageous Effects of Invention

According to the first, fifth, and sixth aspects of the present invention, when data on the working machine is obtained from the data communication device by wireless communication between the data communication device and the mobile terminal, any mobile terminal related to the sold working machine can obtain the data by wireless communication with the data communication device. That is, the data can be obtained only when the relationship between the originating working machine that transmits the data and the mobile terminal that obtains (receives) the data is obvious, which improves the reliability of the obtained data.

According to the second aspect of the present invention, the mobile terminal identification information on the mobile terminal and the working machine identification information can be registered in the management server simultaneously with the obtainment of the authorization key for wireless communication, resulting in that the registration and the obtainment of the authorization key for wireless communication can be achieved rapidly and readily.

According to the third aspect of the present invention, the data communication device can be easily attached to the working machine, and data can be obtained by the added data communication device.

According to the fourth aspect of the present invention, even when the mobile terminal and the data communication device (working machine) are previously registered, a new mobile terminal can be added, and data can be easily obtained by the new mobile terminal.

According to the seventh, eleventh, and twelfth aspects of the present invention, the mobile terminal receives the first authorization key for authenticating wireless communication between the data communication device and the mobile terminal through the second management server, not the first management server. The mobile terminal also receives the second authorization key for authorizing connection to the second management server through the second management server, not the first management server. That is, since any external equipment such as the mobile terminal cannot access the first management server without access to the second management server (for reception of the first authorization key or the second authorization key), the confidentiality of at least information in the user management database of the first management server can be ensured.

Moreover, since the first management server on the higher level than the second management server outputs the first authorization key necessary for wireless communication between the data communication device and the mobile terminal and the second authorization key necessary for the connection to the working machine information database, the security level of obtainment and saving (storage) of data from the working machine can be improved.

According to the eighth aspect of the present invention, the user management code, the machine management code, and data can be registered in the working machine information database to be related to one another. Since the user management code and the machine management code are, for example, numerical values, the user cannot be directly recognized using such codes. Therefore, the confidentiality of data saved in the working machine information database can be improved.

According to the ninth and tenth aspects of the present invention, since the relation between at least the working machine and the mobile terminal (the user) can be extracted from the management data table, it is possible to rapidly recognize from which mobile terminal (the user) the data saved in the working machine information database is transmitted.

BRIEF DESCRIPTION OF DRAWINGS

FIG. 3 is a diagram showing an example of various information stored in a user management database.

FIG. 9 is a diagram showing an example of various information stored in a user management database in the second modification example.

FIG. 10 is a diagram showing an example of data saved in a working machine information database in the second modification example.

FIG. 12 is a diagram illustrating additional registration of a data communication device in a second embodiment.

FIG. 13 is a diagram illustrating additional registration of a data communication device in a third embodiment.

DESCRIPTION OF EMBODIMENTS

Figure 1:
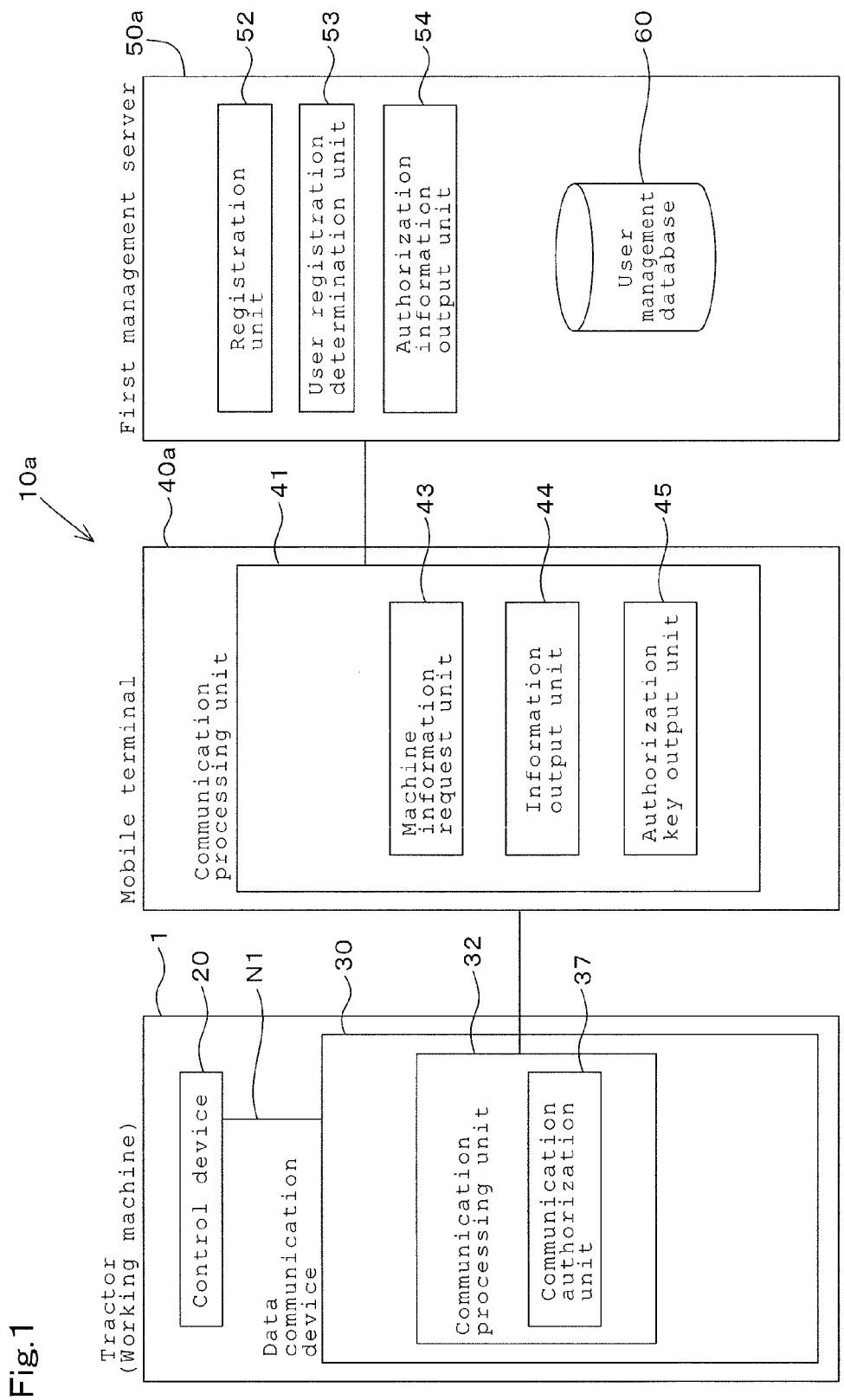
FIG. 1 is a diagram showing a configuration of a data communication system for working machine in a first embodiment.

A data communication system for working machine in each embodiment of the present invention will be described below with reference to figures. Through the below-mentioned embodiments and figures, the same components in the data communication system for working machine are given the same reference numerals and names. Accordingly, overlapping descriptions of the components having the same reference numerals and names are omitted.

[First Embodiment]

FIG. 1 is a diagram showing a schematic configuration of a data communication system for working machine 10a in this embodiment.

As shown in FIG. 1, in the data communication system for working machine 10a, a working machine is provided with a data communication device 30 capable of obtaining various data on the working machine, and data obtained by the data communication device 30 can be easily transmitted to an external mobile terminal 40a. Transmitting the data obtained by the data communication device 30 to the mobile terminal 40a requires authentication (pairing) between the data communication device 30 and the mobile terminal 40a, and only when the pairing is established, the data is transmitted. A management server (first management server) 50a issues an authorization key (may be also referred to as a first authorization key) for the pairing between the data communication device 30 and the mobile terminal 40a. After establishment of the pairing, data outputted from the data communication device 30 to the mobile terminal 40a can be stored (saved) in the mobile terminal 40a.

Examples of the working machine include working machines such as tractors, combine harvesters, and rice planting machine, and construction machines such as backhoes, and using a tractor 1 as an example, the working machine will be described below.

Figure 16:
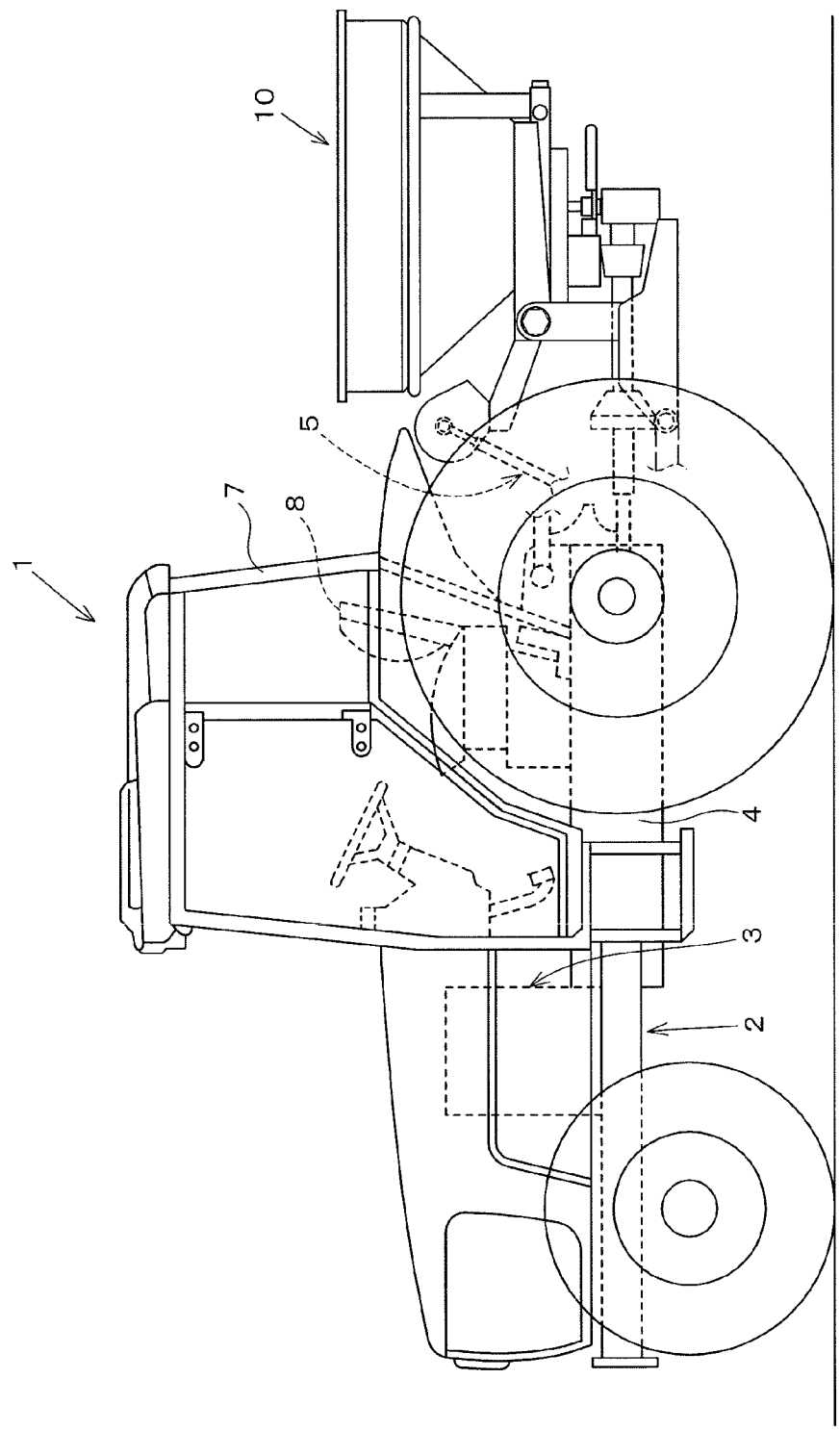
FIG. 16 is a schematic view of an overall configuration of a tractor.

As shown in FIG. 16, the tractor 1 is configured of a travelling vehicle (travelling car body) 2 provided with wheels at its front and rear ends, an engine 3, and a transmission 4. A standalone cabin 7 is provided in the rear of the engine 3, and a driver's seat 8 is provided in the cabin 7. A vertically movable three-point link mechanism 5 and a PTO shaft for transmitting power from the engine 3 are provided in the rear of the travelling vehicle 2. An operating unit 9 such as a fertilizer distributor, a cultivator, an agrichemical distributor, a seed distributor, or a harvest machine can be attached to/detached from the three-point link mechanism 5. In this embodiment, as shown in FIG. 16, a fertilizer distributor is attached to the three-point link mechanism 5.

As shown in FIG. 1, a control device 20 is connected to the data communication device 30 via a vehicle communication network (for example, Controller Area Network or Flex Ray) N1. The control device 20 performs driving control and work control of the tractor 1, in the driving control, controls the operation of the engine, and in the work control, controls operations including the raising/lowering of the three-point link mechanism 5 and outputting of the PTO shaft (rotation number) according to an input value in response to inputs from operational tools such as an operation lever and an operation switch around the driver's seat. Control signals for the driving control and the work control of the tractor 1 and various detection signals for control (for example, detection signal of a sensor) are outputted to the vehicle communication network, and are transmitted to each part of the tractor 1. The driving control and the work control of the control device 20 are not limited to these.

The data communication device 30 obtains various data on the tractor via the vehicle communication network N1, including data indicated by various signals outputted to the vehicle communication network N1 (ex. detection signals of various sensors, control signals, and an alarm signal representing a failure). To output various signals thus obtained outside, the data communication device 30 enables connection between the network on a side of the tractor (vehicle communication network N1) and a network outside of the tractor (for example, wide area network).

For example, to transmit data between equipment belonging to the vehicle communication network N1, such as the control device 20 and the data communication device 30, and the mobile terminal 40a belonging to the wide area network, the data communication device 30 performs various types of communication processing including conversion of communication protocols for different networks.

The data communication device 30 includes a communication processing unit 32 for executing various types of communication processing. The communication processing unit 32 executes processing for short-distance wireless communication such as Wi-Fi (registered trademark). In this embodiment, the communication processing unit 32 executes processing for wireless communication by Wi-Fi (Wireless Fidelity, registered trademark) conforming to the communication standard IEEE802.11 series.

On the other hand, the mobile terminal 40a is, for example, a smartphone (multifunctional mobile phone) or a mobile computer such as a tablet, which has a relatively high computing capability. The mobile terminal 40a performs short-distance wireless communication such as Wi-Fi (registered trademark). The mobile terminal 40a includes a communication unit (communication processing unit 41) for executing processing related to communication.

The first management server 50a mainly manages the authorization key for authorizing the authentication (pairing) between the data communication device 30 and the mobile terminal 40a.

Figure 2:
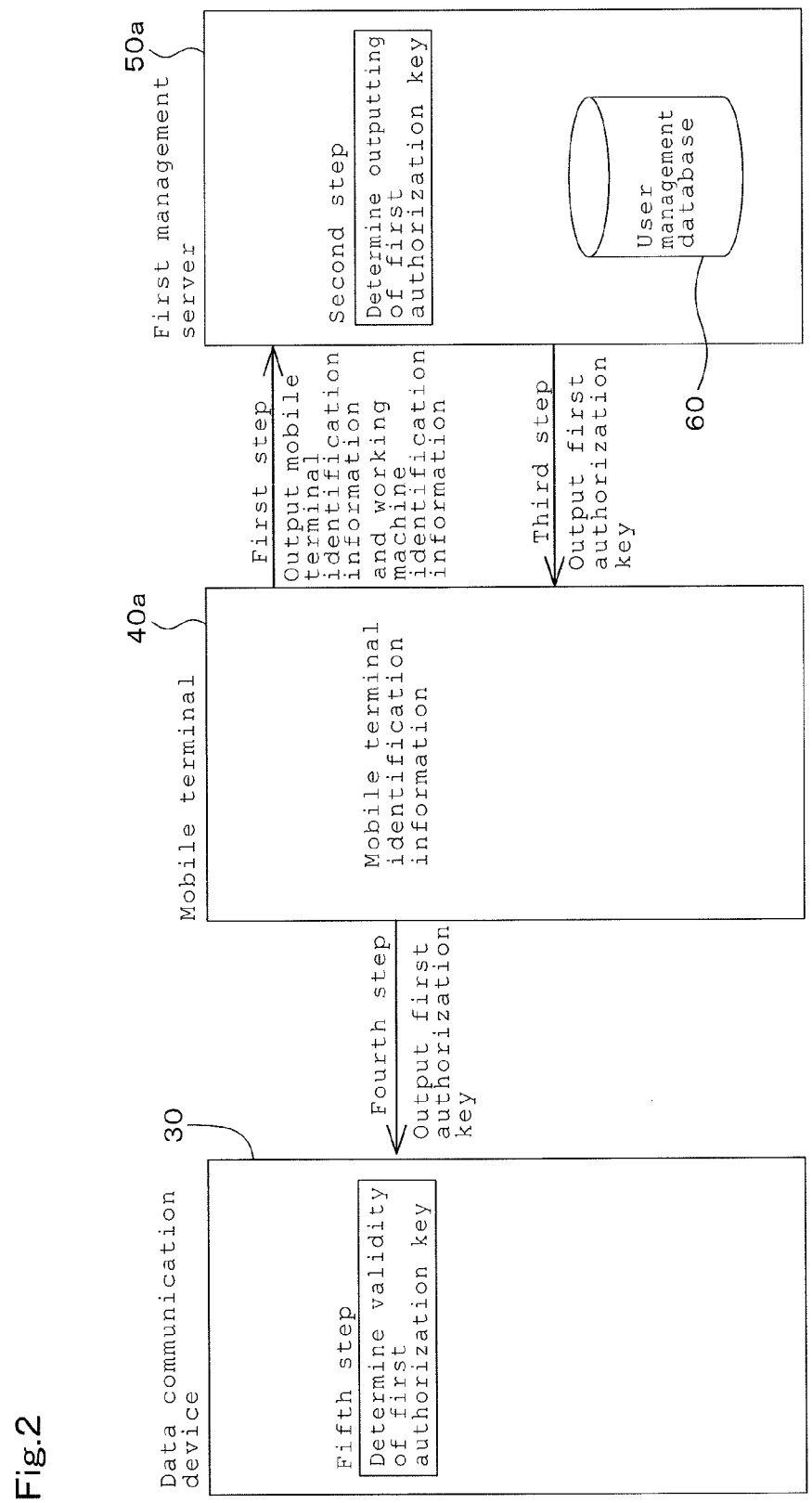
FIG. 2 is a diagram illustrating pairing between a data communication device and a mobile terminal.

As shown in FIG. 2, to perform the pairing between the data communication device 30 and the mobile terminal 40a, first, the mobile terminal 40a transmits the mobile terminal identification information identifying the mobile terminal 40a to the first management server 50a, and the working machine identification information identifying the working machine related to the data communication device 30 to be paired (first step).

Next, the first management server 50a determines whether or not the first authorization key is outputted to the mobile terminal 40a on the basis of the mobile terminal identification information and the working machine identification information outputted from the mobile terminal 40a, and information registered in a user management database 60 of the first management server 50a (second step).

When outputting of the first authorization key to the mobile terminal 40a is authorized in the first management server 50a, the first authorization key is outputted from the first management server 50a to the mobile terminal 40a (third step).

When obtaining the first authorization key from the first management server 50a, the mobile terminal 40a outputs the first authorization key to the data communication device 30 (fourth step). When receiving the first authorization key, the data communication device 30 authenticates the authorization key (first authorization key) previously stored therein and the first authorization key to determine the validity of the first authorization key (fifth step).

When accepting the validity of the first authorization key, the data communication device 30 authorizes outputting (transmission) of data from the data communication device 30 to the mobile terminal 40a (establishment of pairing), and transmits the data from the data communication device 30 to the mobile terminal 40a.

In this manner, the pairing between the data communication device 30 and the mobile terminal 40a can be achieved through the processing from first step to fifth step, that is, the processing between the mobile terminal 40a and the first management server 50*a*, and the processing between the mobile terminal 40*a* and the data communication device 30.

In the pairing between the data communication device 30 and the mobile terminal 40*a*, the mobile terminal 40*a* obtains the first authorization key by transmitting the mobile terminal identification information and the working machine identification information to the first management server 50*a*. However, in the case where the pairing is previously established using the first authorization key even once, pairing in subsequent cases may be achieved by transmitting the previously obtained first authorization key to the data communication device 30 without transmitting the mobile terminal identification information and the working machine identification information from the mobile terminal 40*a* to the first management server 50*a*.

First, the first management server 50*a* will be described in detail. The user management database 60 of the first management server 50*a* stores information on the working machine owned by the user (the user), information on the mobile terminal owned by the user, and information on the user.

The information on the working machine, the information on the mobile terminal, and the information on the user are stored (registered) when the user purchases the working machine along with the data communication device 30 from a sales company or other distributors, or when the user separately purchases the data communication device 30 after purchase of the working machine.

For example, when the user purchases the working machine (such as tractor) and the data communication device 30, as shown in FIG. 3, an address, a name, a password, a user ID, and so on of the user, which are the information on the user, are registered (stored) in the user management database 60. The address, the name, the password, and the user ID of the user are user identification information. The user identification information may be any information capable of identifying the user.

The user management database 60 stores a phone number of the mobile terminal 40*a* owned by the user as the information on the mobile terminal. The phone number is mobile terminal identification information identifying the mobile terminal 40*a*. The mobile terminal identification information may be any unique information identifying the mobile terminal 40*a*.

A serial number and a model of the tractor, which identify the tractor 1 purchased by the user, a serial number identifying the control device 20, and a serial number identifying the data communication device 30 are further registered as the information on the working machine. The serial number and the model of the tractor, the serial number of the control device 20, and the serial number of the data communication device 30 are working machine identification information identifying the working machine. The working machine identification information may be unique information identifying the tractor 1, the control device 20, and the data communication device 30.

Hereinafter, to distinguish the mobile terminal identification information and the working machine identification information stored in the user management database 60 from the mobile terminal identification information and the working machine identification information outputted from the mobile terminal 40*a*, the mobile terminal identification information stored in the user management database 60 is referred to as "stored mobile information", the working machine identification information stored in the user management database 60 is referred to as "stored working machine information", the mobile terminal identification information outputted from the mobile terminal 40*a* is referred to as "outputted mobile information", and the working machine identification information outputted from the mobile terminal 40*a* is referred to as "outputted working machine information".

A method of registering various information (information on the working machine, information on the mobile terminal, and information on the user) in the user management database 60 includes a first method in which mainly a sales company or other distributors registers the information at sales of the working machine by using a computer at the distributor, and a second method in which the user accesses directly to the first management server 50*a* after purchase of the working machine to register the information.

In any of the first method and second method, when the various information is inputted to the first management server 50*a*, a registration unit 52 in the first management server 50*a* registers the various information. The registration unit 52 is configured with, for example, a program stored in the first management server 50*a*.

Specifically, when the serial number and the model of the tractor, the serial number of the control device 20, the serial number of the data communication device 30, the phone number of the mobile terminal, the address, the name, etc. are transmitted to the first management server 50*a* and inputted to the first management server 50*a*, the registration unit 52 relates the serial number and the model of the tractor, the serial number of the control device 20, the serial number of the data communication device 30, the phone number of the mobile terminal, the address, and the name with one another, and stores (registers) them in the user management database 60.

When information that enables the relation between the mobile terminal 40*a* and the data communication device (tractor) is collected, the registration unit 52 issues a first authorization key used for pairing, relates the first authorization key to the various information, and stores them in the user management database 60.

For example, when the mobile terminal identification information (for example, phone number) on the mobile terminal 40*a* owned by the user, and the working machine identification information identifying the working machine owned by the user (at least one of the serial number and the model of the tractor, the serial number of the control device 20, and the serial number of the data communication device 30) are collected in the user management database 60, the registration unit 52 issues the first authorization key that corresponds to the mobile terminal identification information and the working machine identification information, a relates the first authorization key, the mobile terminal identification information, and the working machine identification information to one another, and registers them in the user management database 60. When information on the user, such as user ID and password, in addition to the mobile terminal identification information and the working machine identification information, is inputted to the first management server 50*a*, the registration unit 52 may issue the first authorization key.

As shown in FIG. 1, the user registration determination unit 53 provided in the first management server 50 determines whether or not the first authorization key is outputted to the mobile terminal 40*a* owned by the user. The user registration determination unit 53 is configured, for example, of a program stored in the first management server 50*a*.

For example, when the user performs agricultural tasks in an agricultural field using the working machine (tractor), in the case where the user outputs the outputted mobile information and the working machine identification information to the first management server 50*a* using his/her mobile terminal 40*a*, the user registration determination unit 53 first determines whether or not the outputted mobile information outputted from the mobile terminal 40a and the outputted working machine information outputted from the mobile terminal 40a are stored to be related to each other in the user management database 60.

As shown in FIG. 3, in the state where various information is registered in the user management database 60, for example, "012-9354-2973" as the outputted mobile information is outputted to the first management server 50a, and "10013 (serial number of the tractor, M115A (model of the tractor)) as the outputted working machine information is outputted to the first management server 50a.

In this case, since "012-9354-2973" as the outputted mobile information and "10013, M115A" as the outputted working machine information are stored to be related to each other in the user management database 60, the user registration determination unit 53 authorizes outputting of the first authorization key corresponding to "012-9354-2973" and "10013, M135A".

As shown in FIG. 1, an authorization information output unit 54 in the first management server 50 outputs the first authorization key to the mobile terminal 40a owned by the user. The authorization information output unit 54 is configured, for example, of a program stored in the first management server 50a.

When the user registration determination unit 53 authorizes outputting of the first authorization key, the authorization information output unit 54 reads the first authorization key corresponding to the outputted mobile information and the outputted working machine information from the user management database 60, and outputs the first authorization key to the mobile terminal 40a. When the user registration determination unit 53 determines that the first authorization key is not outputted, the authorization information output unit 54 does not output the first authorization key.

Next, the mobile terminal 40a will be described. The mobile terminal 40a includes a machine information request unit 43, an information output unit 44, and an authorization key output unit 45. The machine information request unit 43, the information output unit 44, and the authorization key output unit 45 each are configured, for example, of a program stored in the mobile terminal 40a.

In the pairing between the mobile terminal 40a and the data communication device 30, the machine information request unit 43 requests the working machine identification information previously stored in the data communication device 30 to the data communication device 30.

When obtaining the first authorization key from the first management server 50a, the information output unit 44 transmits the mobile terminal identification information and the working machine identification information obtained by the machine information request unit 43 to the first management server 50a.

For example, in the pairing, when a pairing program of the mobile terminal 40a is started, and a user ID and a password is inputted to the mobile terminal 40a, the information output unit 44 outputs the inputted user ID and password to the first management server 50a. When log-in of the mobile terminal 40a to the first management server 50a is authorized using the user ID and the password, the mobile terminal identification information stored in the mobile terminal 40a and the working machine identification information previously obtained from the data communication device 30 are automatically outputted to the first management server 50a.

The mobile terminal 40a includes the authorization key output unit 45. The authorization key output unit 45 is configured, for example, of a program stored in the mobile terminal 40a.

When the first authorization key is obtained from the first management server 50a, the first authorization key is stored in the mobile terminal 40a. In pairing, the authorization key output unit 45 transmits the first authorization key stored in the mobile terminal 40a to the data communication device 30.

In pairing between the mobile terminal 40a and the data communication device 30 after the obtainment of the first authorization key outputted from the first management server 50a, the authorization key output unit 45 outputs the first authorization key outputted from the first management server 50a to the data communication device 30.

Next, a configuration related to the pairing in the data communication device 30 will be described.

The data communication device 30 stores the first authorization key necessary for the pairing between the data communication device 30 and the mobile terminal 40a therein. The first authorization key is previously stored in the data communication device 30, for example, at manufacturing of the data communication device 30.

Furthermore, the communication processing unit 32 of the data communication device 30 includes a communication authorization unit 37. The communication authorization unit 37 is configured, for example, of a program stored in the data communication device 30.

When receiving the first authorization key from the mobile terminal 40a, the communication authorization unit 37 authenticates this first authorization key and the first authorization key previously stored in the data communication device 30 to determine whether or not the first authorization key transmitted from the mobile terminal 40a is valid. Then, when determining that the authorization key outputted from the mobile terminal 40a is valid, the communication authorization unit 37 authorizes the pairing between the data communication device 30 and the mobile terminal 40a. That is, the communication authorization unit 37 authorizes transmission of data collected in the data communication device 30 to the mobile terminal 40a, and transmits the collected data to the mobile terminal 40a. On the contrary, when determining that the authorization key is invalid, the communication authorization unit 37 does not authorize transmission of the data from the data communication device 30 to the mobile terminal 40a.

Figure 4:
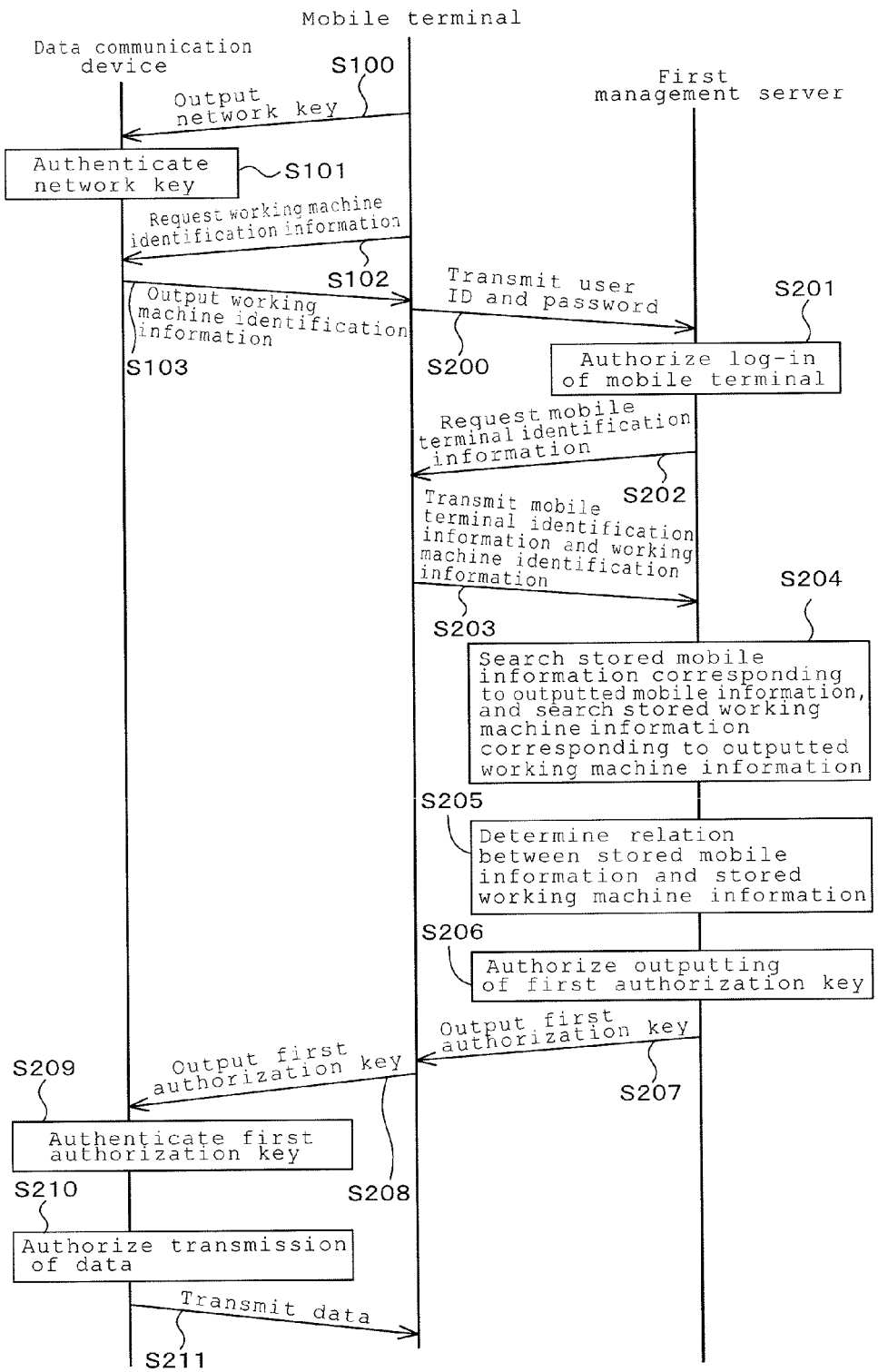
FIG. 4 is a diagram showing an operational flow of the data communication system for working machine in the first embodiment.

FIG. 4 is a diagram illustrating the operation of the data communication device, the mobile terminal, and the first management server. With reference to FIG. 4, the operation of the data communication system for working machine 10a will be described.

Prior to the pairing between the data communication device 30 and the mobile terminal 40a, the user registers information (the user ID and the password) for log-in to the first management server 50a into the user management database 60. Further, prior to the pairing, the working machine identification information owned by the user and the mobile terminal identification information owned by the user are registered in the user management database 60.

In the pairing between the data communication device 30 and the mobile terminal 40a, first, the network key stored in the mobile terminal 40a is automatically outputted from the mobile terminal 40a to the data communication device 30 (step S100).

When receiving the network key, the data communication device 30 authenticates the network key previously set to the device and the network key transmitted from the mobile terminal 40a (step S101).

The authentication between the network keys of the data communication device 30 and the mobile terminal 40a is implemented in advance for the pairing between the data communication device 30 and the mobile terminal 40a. When the authentication between the network keys is established, wireless communication between the data communication device 30 and the mobile terminal 40a can be achieved. In the state where wireless communication is enabled using the network key, the data communication device 30 can wirelessly communicate with the mobile terminal 40a, but data collected in the data communication device 30 is not transmitted to the mobile terminal 40a. Specifically, when the authentication is established on the basis of the network key, the machine information request unit 43 of the mobile terminal 40a can request the working machine identification information to the data communication device 30.

The machine information request unit 43 of the mobile terminal 40a requests the working machine identification information stored in the data communication device 30 (step S102).

When receiving the request of the working machine identification information from the mobile terminal 40a, the data communication device 30 outputs the working machine identification information to the mobile terminal 40a (step S103). When obtaining the working machine identification information, the mobile terminal 40a stores the working machine identification information.

Next, when the user ID and the password are inputted to the mobile terminal 40a, the information output unit 44 outputs the user ID and the password to the first management server 50a (step S200).

In the case where the user ID and the password that are outputted from the mobile terminal 40a are related and stored in the user management database 60, the first management server 50a authorizes log-in of the mobile terminal 40a (step S201). The first management server 50a requests the mobile terminal identification information on the mobile terminal 40a authorized for log-in, and the working machine identification information (step S202). In response to the request of the mobile terminal identification information and the working machine identification information from the first management server 50a, the information output unit 44 of the mobile terminal 40a outputs its own mobile terminal identification information (outputted mobile information) to the first management server 50a, and the working machine identification information (outputted working machine information) obtained from the data communication device 30 to the first management server 50a (step S203).

When the outputted mobile information and the outputted working machine information are inputted to the first management server 50a, the user registration determination unit 53 of the first management server 50a determines whether or not the stored mobile information that corresponds to the outputted mobile information is present in the stored mobile information stored in the user management database 60, and determines whether or not the stored working machine information that corresponds to the outputted working machine information is present (step S204).

In the case where the stored mobile information that corresponds to the outputted mobile information is present in the stored mobile information stored in the user management database 60, and the stored working machine information that corresponds to the outputted working machine information is present, the user registration determination unit 53 of the first management server 50a determines whether or not the stored mobile information is related to the stored working machine information (step S205).

In the case where the stored mobile information is related to the stored working machine information, the user registration determination unit 53 authorizes the mobile terminal 40a corresponding to the outputted mobile information to output the authorization key (step S206). In response to the output authorization from the user registration determination unit 53, the authorization information output unit 54 outputs the first authorization key to the mobile terminal 40a (step S207).

When receiving the first authorization key transmitted from the first management server 50a, the authorization key output unit 45 of the mobile terminal 40a transmits the first authorization key to the data communication device 30 (step S208).

When the data communication device 30 receives the first authorization key, the communication authorization unit 37 of the data communication device 30 reads the first authorization key stored in the device, and authenticates the read first authorization key and the received first authorization key (step S209). When the authentication of the first authorization key is established (the validity of the first authorization key is confirmed), the communication authorization unit 37 authorizes the data communication device 30 to output the obtained data to the mobile terminal 40a (step S210). In response to the authorization for data transmission, the data communication device 30 transmits the data to the mobile terminal 40a (step S211). In the case where the pairing between the data communication device 30 and the mobile terminal 40a has been made using the first authorization key, above-mentioned step S200 to step S207 are omitted in second and subsequent pairing. In this case, at start of the program for pairing, the first authorization key output unit 45 of the mobile terminal 40a outputs the first authorization key stored in the mobile terminal 40a to the data communication device 30, and the data communication device 30 implements authentication on pairing by using the first authorization key transmitted from the mobile terminal 40a.

According to the present invention, the mobile terminal identification information and the working machine identification information are outputted to the first management server 50a, and the first authorization key for pairing is outputted on the basis of the outputted mobile terminal identification information and working machine identification information, and the mobile terminal identification information and the working machine identification information in the user management database 60. Therefore, to obtain data from the data communication device 30 (working machine), the sold working machine and the mobile terminal 40a related to the working machine need to be registered in the user management database 60, and at obtainment of data, the first management server 50a needs to authenticate the registration of the working machine and the mobile terminal 40a. As described above, data is obtained from the working machine after the authentication of registration of the mobile terminal 40a and the data communication device 30 (working machine), thereby preventing unauthorized obtainment of data and improving the reliability of the obtained data.

In recent years, there is a demand for obtaining work data in agricultural task in the agricultural field. However, the conventional systems have no method of obtaining work data in agricultural tasks securely and properly.

For example, when the user purchases an agricultural machine such as tractor and the data communication device 30 accompanied with the agricultural machine, the user identification information, the working machine identification information, and the mobile terminal identification information are registered in the user management database 60. Then, when performing agricultural tasks using the tractor, the user logs in to the first management server 50a by means of the own mobile terminal 40a and then, establishes pairing between the mobile terminal 40a and the data communication device 30 using the first authorization key obtained from the first management server 50a. After the establishment of pairing, data can be transmitted from the data communication device 30 to the mobile terminal 40a, and information on the tractor in the agricultural tasks can be saved (stored) in the mobile terminal 40a.

As apparent from this, the work data in the agricultural task can be obtained only by combining the mobile terminal 40a owned by the user and the agricultural machine that the user uses to perform the agricultural tasks (data communication device 30), thereby realizing the data structure in which the work data, the user who operates the agricultural machine, and the agricultural machine are related to one another. The user transmits the work data in the agricultural task, which is saved in the mobile terminal 40a, for example, to a computer other than the mobile terminal 40a, organizes the work data using the computer, and uses the data to make a work plan and a work report for each agricultural field, for example. According to the present invention, the actually-operated agricultural machine at obtainment of data is clearly related to the mobile terminal that obtains the data (operator of the agricultural machine), therefore what operation of the agricultural machine can increase the harvest amount in the agricultural field can be analyzed depending on the actual conditions.

In the embodiments described above, in the case where the outputted mobile information (stored mobile information) is related to the outputted working machine information (stored working machine information) in the user management database 60, the first authorization key is issued and outputted. However, even when the outputted mobile information is not related to the outputted working machine information at inputting to the first management server 50a, the first authorization key may be issued and outputted. In other words, the registration of the outputted mobile information and the outputted working machine information in the user management database 60, and the issue and outputting of the first authorization key may be made at the same time.

Figure 5:
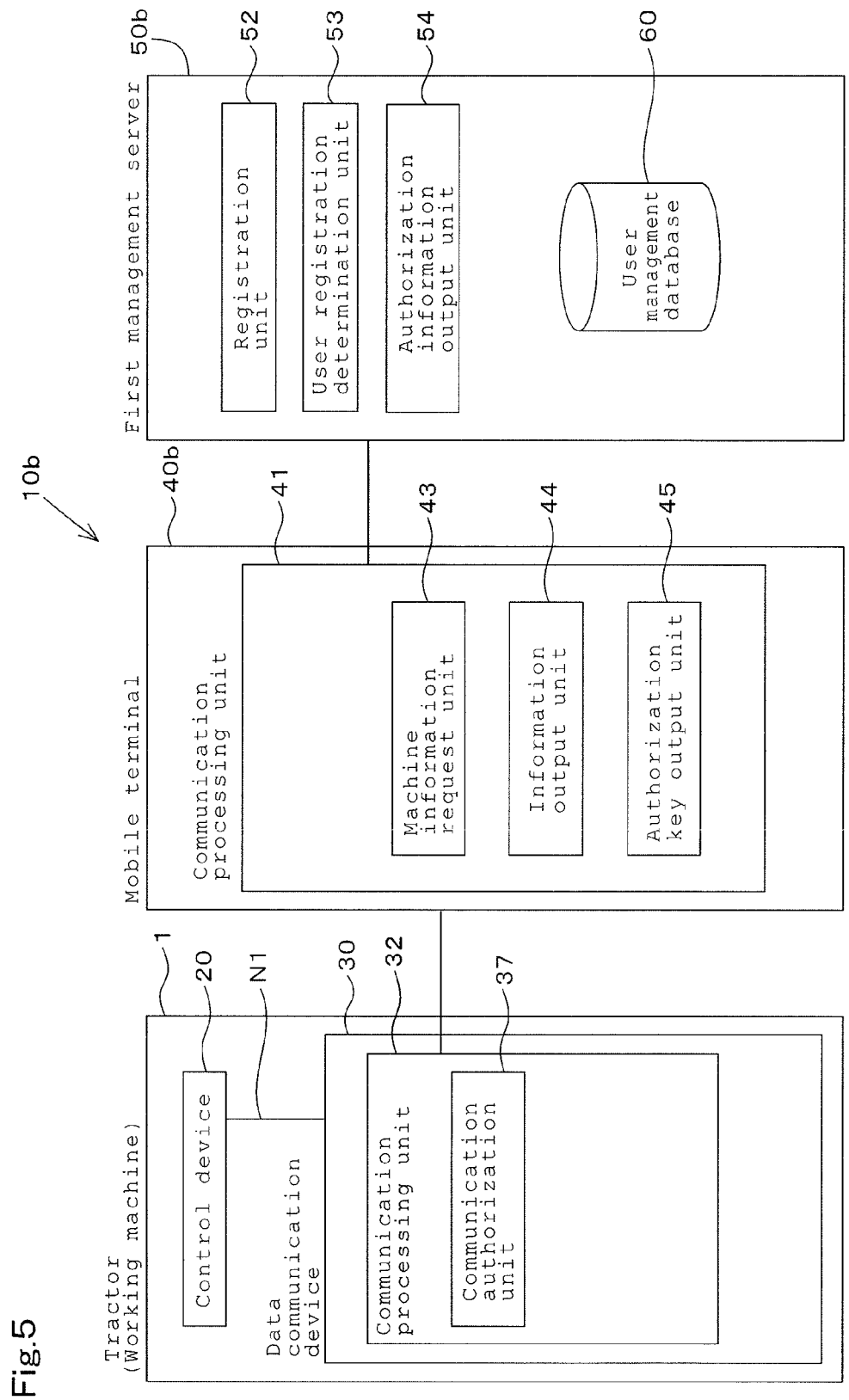
FIG. 5 is a diagram showing a configuration of a data communication system for working machine in a first modification example.

FIG. 5 shows a data communication system for working machine 10b in a first modification example (first modification example). When the mobile terminal identification information (outputted mobile information) and the working machine identification information (outputted working machine information) are outputted from a mobile terminal 40b to a management server 50b, except for the case where the outputted mobile information and the outputted working machine information has been already related to each other and stored, the registration unit 52 of a first management server 50b in FIG. 5 relates the outputted mobile information to the outputted working machine information and stores them in the user management database 60.

The registration unit 52 stores the outputted mobile information and the outputted working machine information in the user management database 60, and at the same time, issues the first authorization key corresponding to the outputted mobile information and the outputted working machine information, and stores the first authorization key in the user management database 60.

In response to issue of the first authorization key by the registration unit 52 (when the registration unit 52 issues the first authorization key), the user registration determination unit 53 determines that the outputted mobile information is related to the outputted working machine information. In the case where the user registration determination unit 53 determines that the outputted mobile information is related to the outputted working machine information, the authorization information output unit 54 reads the first authorization key corresponding to the outputted mobile information determined to be related to the outputted working machine information from the user management database 60, and outputs the read first authorization key to the mobile terminal 40b. That is, this first authorization key is outputted when the registration unit 52 issues the first authorization key.

Figure 6:
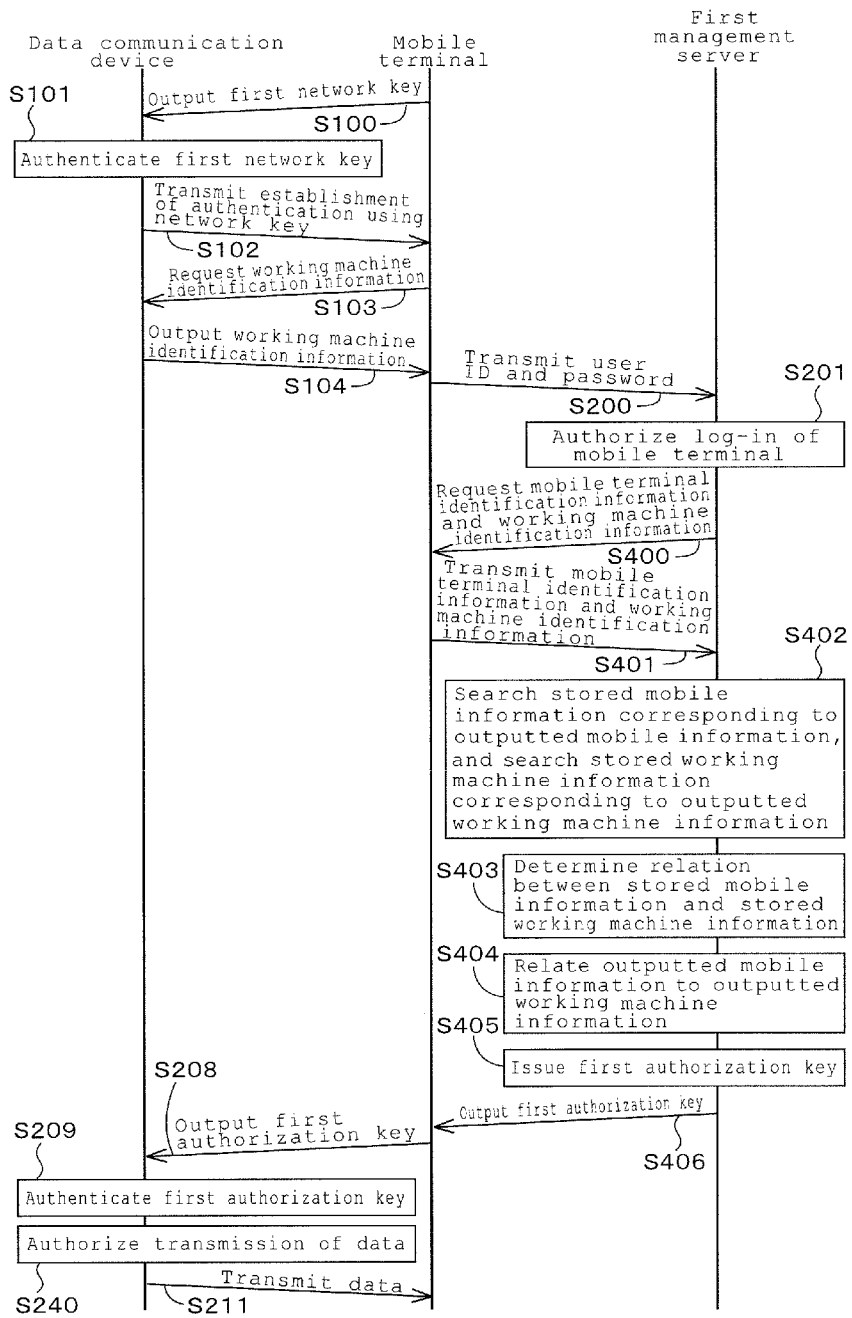
FIG. 6 is a diagram showing an operational flow of the data communication system for working machine in the first modification example.

FIG. 6 is a diagram illustrating the operation of the data communication device, the mobile terminal, and the management server in the data communication system for working machine 10b. Description of the same operation is omitted.

After authorization of log-in to the first management server 50b, the management server 50b requests the mobile terminal identification information on the mobile terminal 40b authorized to log-in and the working machine identification information (step S400). In response to the request of the mobile terminal identification information and the working machine identification information from the first management server 50b, the information output unit 44 of the mobile terminal 40b outputs own mobile terminal identification information (outputted mobile information) to the first management server 50b, and outputs the working machine identification information obtained from the data communication device 30 (outputted working machine information) to the first management server 50b (step S401).

When the outputted mobile information and the outputted working machine information are inputted to the first management server 50b, the registration unit 52 of the first management server 50b determines whether or not stored mobile information corresponding to the outputted mobile information is present in the stored mobile information in the user management database 60, and determines whether or not stored working machine information corresponding to the outputted working machine information is present (step S402).

In the case where the stored mobile information corresponding to the outputted mobile information is present in the stored mobile information stored in the user management database 60, and the stored working machine information corresponding to the outputted working machine information is present, the registration unit 52 of the first management server 50b determines whether or not the stored mobile information is related to the stored working machine information (step S403).

In the case where the stored mobile information is related to the stored working machine information, the outputted mobile information is also related to the outputted working machine information. Thus, the registration unit 52 of the first management server 50b shifts processing to the user registration determination unit 53 without issuing the first authorization key, and the user registration determination unit 53 determines that the relation is made.

On the contrary, in the case where the stored mobile information is not related to the stored working machine information, the registration unit 52 of the first management server 50b relates the outputted mobile information to the outputted working machine information (step S404), stores them in the user management database 60, and issues the first authorization key corresponding to the outputted mobile information and the working machine identification information (step S405).

Figure 7:
FIG. 7 is a diagram illustrating registration of working machine identification information and mobile terminal identification information in the first modification example.

For example, as shown in FIG. 7(*a*), it is assumed that the stored mobile information and the stored working machine information are stored in the user management database 60. Given that the mobile terminal 40*b* outputs "012-9354-2973" as the outputted mobile information to the management server 50*b*, and outputs "20891 (serial number of the tractor, M115A (model of the tractor)" as the outputted working machine information to the management server 50*b*.

Referring to the user management database 60 (FIG. 7 (*a*)), although "012-9354-2973" that is the outputted mobile information and "20891, M115A" that is the outputted working machine information outputted from the mobile terminal 40*b* are stored in the user management database 60, "012-9354-2973" is related to "10013, M115A" that is another stored working machine information.

That is, the outputted mobile information ("012-9354-2973") outputted from the mobile terminal 40*b* is not related to the outputted working machine information ("20891, M115A") outputted from the mobile terminal 40*b* in the user management database 60.

Thus, as shown in FIG. 7(*b*), the registration unit 52 of the management server 50*b* relates the outputted mobile information "012-9354-2973" to the outputted working machine information "20891, M115A", stores them in the user management database 60, and issues the corresponding first authorization key.

When the registration unit 52 issues the first authorization key, the authorization information output unit 54 outputs the first authorization key because the outputted mobile information "012-9354-2973" is related to the outputted working machine information "20891, M115A" at registration (step S406). The authentication for determining the validity of the first authorization key is the same as in step S208 to step S210 and thus, description thereof is omitted.

In the case shown in FIG. 6 and FIG. 7, since the authentication between the mobile terminal 40*b* and the data communication device 30, and the registration of the authorization authentication information (for example, mobile terminal identification information and working machine identification information) can be simultaneously made, the operation of obtaining the authorization key for the registration and authentication can be simplified.

Figure 8:
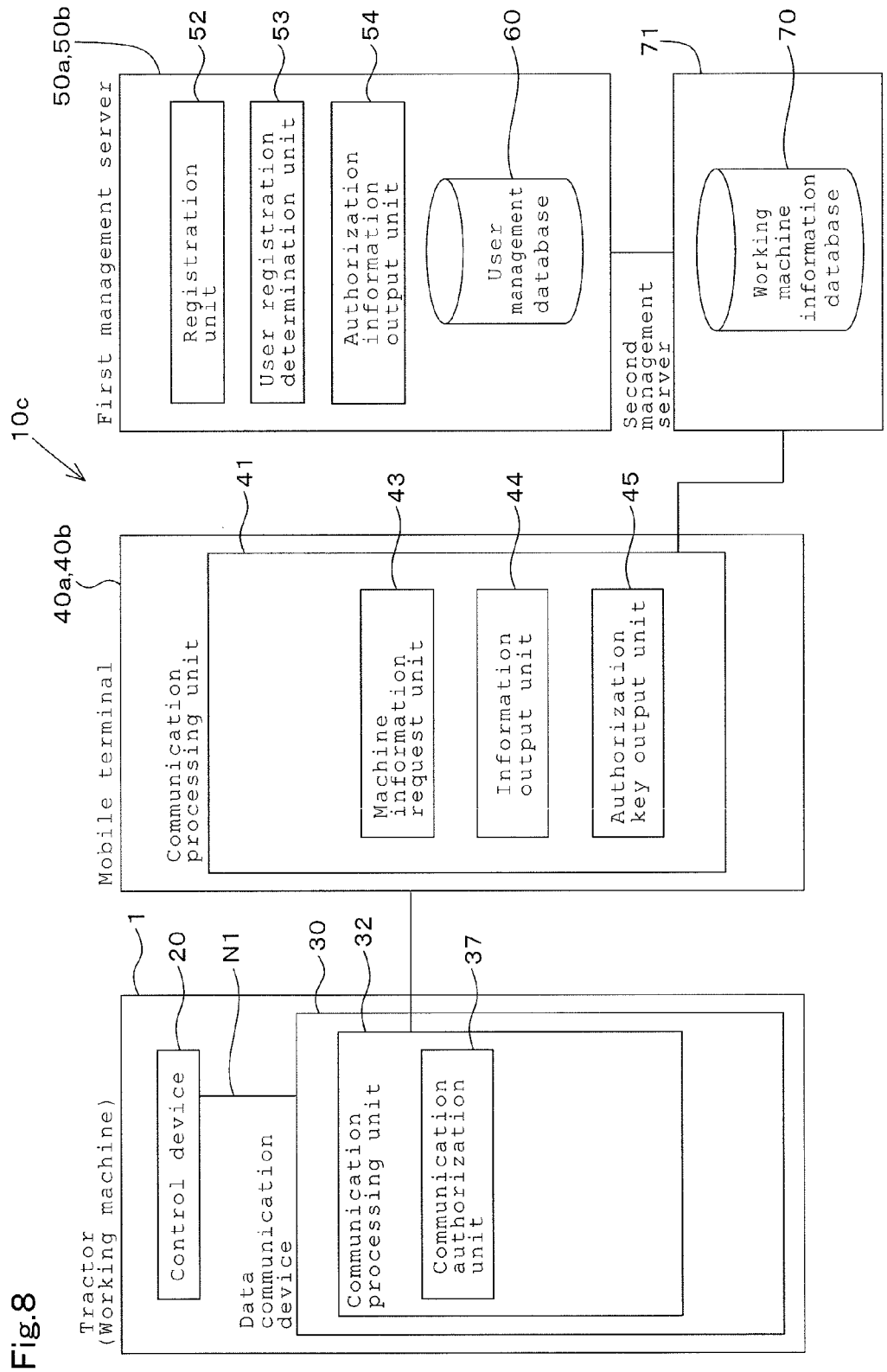
FIG. 8 is a diagram showing a configuration of a data communication system for working machine in a second modification example.

FIG. 8 is an overall view of a data communication system for working machine 10*c* in a second modification example (second modification example) of the embodiment. The data communication system for working machine 10*c* is different from the above-mentioned data communication system for working machine in the data structure of the user management database 60 in the first management server 50*a*, 50*b*, the access method of the mobile terminal 40*a*, 40*b* to the first management server 50*a*, 50*b*, and the storage method of data obtained by the mobile terminal 40*a*, 40*b*.

First, the data structure of the user management database 60 in a second modification example will be described.

As shown in FIG. 9(*a*), to identify the tractor 1, the serial number and the model of the tractor, the serial number of the control device 20, and the serial number of the data communication device 30 that are the information on the working machine are registered in the user management database 60 of the data communication system for working machine 10*c*. A machine management code for managing at least the working machine (tractor), which is related to the working machine, is also stored in the user management database 60. The machine management code is unique, and may serve to manage the machine (equipment) such as the control device 20 attached to the working machine, or the data communication device 30 attached to the working machine, instead of the working machine. Alternatively, the above-mentioned working machine identification information may be used as the machine management code.

As shown in FIG. 9(*b*), an address, a name, a password, a user ID of the user as the information on the user, and a phone number of the mobile terminal 40*a*, 40*b* owned by the user as the information on the mobile terminal are stored in the user management database 60. A user management code for distinguishing (identifying) at least the user is also stored in the user management database 60. The user management code may be assigned to be related to the mobile terminal 40*a*, 40*b* owned by the user, in place of the user. In this embodiment, the user management code is uniquely assigned for management, separately from the address, the name, the password, the user ID, and the phone number.

In this embodiment, the user management database 60 stores the machine management code uniquely assigned to manage the working machine and the user management code uniquely assigned to manage the user therein.

As shown in FIG. 9(*c*), the user management database 60 includes a management data table for extracting a working machine (tractor) and the user who owns the working machine, on the basis of the machine management code and the user management code. In the management data table, the assigned machine management codes and the assigned user management codes are arranged in a matrix state, and the information on the working machine (the serial number and the model of the tractor, the serial number of the control device 20, and the serial number of the data communication device 30) in FIG. 9(*a*) and the information on the mobile terminal (the phone number) and the user identification information (the address, the name, the password, the user ID) in FIG. 9(*b*) can be extracted on the basis of the both codes.

Next, the access method of the mobile terminal 40*a*, 40*b* to the first management server 50*a*, 50*b* in the second modification example will be described.

The mobile terminal 40*a*, 40*b* directly accesses the first management server 50*a*, 50*b* in the embodiments, while the mobile terminal 40*a*, 40*b* accesses the first management server 50*a*, 50*b* via a second management server 71 provided separately from the first management server 50*a*, 50*b* in the second modification example.

Specifically, to allow the mobile terminal 40*a*, 40*b* to obtain the first authorization key, information (the user ID, the password, the mobile terminal identification information, and working machine identification information) is outputted (transmitted) to the first management server 50*a*, 50*b* via the second management server 71. The first authorization key is also transmitted to the mobile terminal 40*a*, 40*b* from the first management server 50*a*, 50*b* via the second management server 71.

In addition, when transmitting the first authorization key to the mobile terminal 40*a*, 40*b* via the second management server 71, the first management server 50*a*, 50*b* transmits an authorization key (second authorization key) used to authenticate whether or not an access (connection) to the second management server 71 is authorized, to the mobile terminal 40*a*, 40*b* via the second management server 71, such that the mobile terminal 40*a*, 40*b* that receives the first authorization key can access the second management server 71. When issuing the first authorization key, the first management server 50*a*, 50*b* generates the second authorization key other than the first authorization key. The second authorization key is different from the user ID or the password issued when the user is first registered in the first management server 50*a*, 50*b*, and is used for the mobile terminal 40*a*, 40*b* to log in to the second management server 71, which is arranged separately from the first management server 50a, 50b and is lower than the first management server 50a, 50b in authorization. The second authorization key is used to access the second management server 71 as well as a working machine information database 70 in the second management server 71.

That is, summarizing the access method of the mobile terminal 40a, 40b to the first management server 50a, 50b, the first management server 50a, 50b receives the mobile terminal information on the mobile terminal 40a, 40b owned by the user and the working machine identification information on the working machine owned by the user, and in the case where the received mobile terminal information and working machine identification information are stored to be related to each other in the user management database 60, the first management server 50a, 50b outputs the first authorization key to the second management server 71. Further, the first management server 50a, 50b outputs the second authorization key to the second management server 71.

When receiving the first authorization key, the second management server 71 transmits (outputs) the first authorization key to the mobile terminal 40a, 40b, and transmits (outputs) the second authorization key to the mobile terminal 40a, 40b.

When the first authorization key is transmitted to the mobile terminal 40a, 40b via the second management server 71, the first management server 50a, 50b transmits the user management code and the machine management code in addition to the first authorization key. For example, on the basis of the mobile terminal identification information and the working machine identification information related to the first authorization key, the first management server 50a, 50b extracts the corresponding user management code and machine management code from the user management database 60, and transmits the extracted user management code and machine management code along with the first authorization key to the mobile terminal 40a, 40b via the second management server 71.

Next, the storage method of data obtained by the mobile terminal 40a, 40b will be described.

Data transmitted from the data communication device 30 is stored in the mobile terminal 40a, 40b in the embodiment described above, while data obtained by the mobile terminal 40a, 40b is stored in the working machine information database 70 of the second management server 71 in the second modification example.

Specifically, the mobile terminal 40a, 40b accesses (logs in to) the second management server 71 using the second authorization key issued from the first management server 50a, 50b. When the second authorization key transmitted from the mobile terminal 40a, 40b is valid, the second management server 71 authorizes connection of the mobile terminal 40a, 40b.

After completion of log-in (connection) to the second management server 71, the mobile terminal 40a, 40b transmits the data obtained by the mobile terminal 40a, 40b to the working machine information database 70 in the second management server 71. When transmitting the data to the working machine information database 70, the mobile terminal 40a, 40b also transmits the machine management code and the user management code issued from the first management server 50a, 50b to the working machine information database 70.

When the second management server 71 (working machine information database 70) receives the data from the mobile terminal 40a, 40b, as shown in FIG. 10, information from the mobile terminal 40a, 40b is stored in the working machine information database 70 such that the user management code, the machine management code, and data are related to one another.

Figure 11:
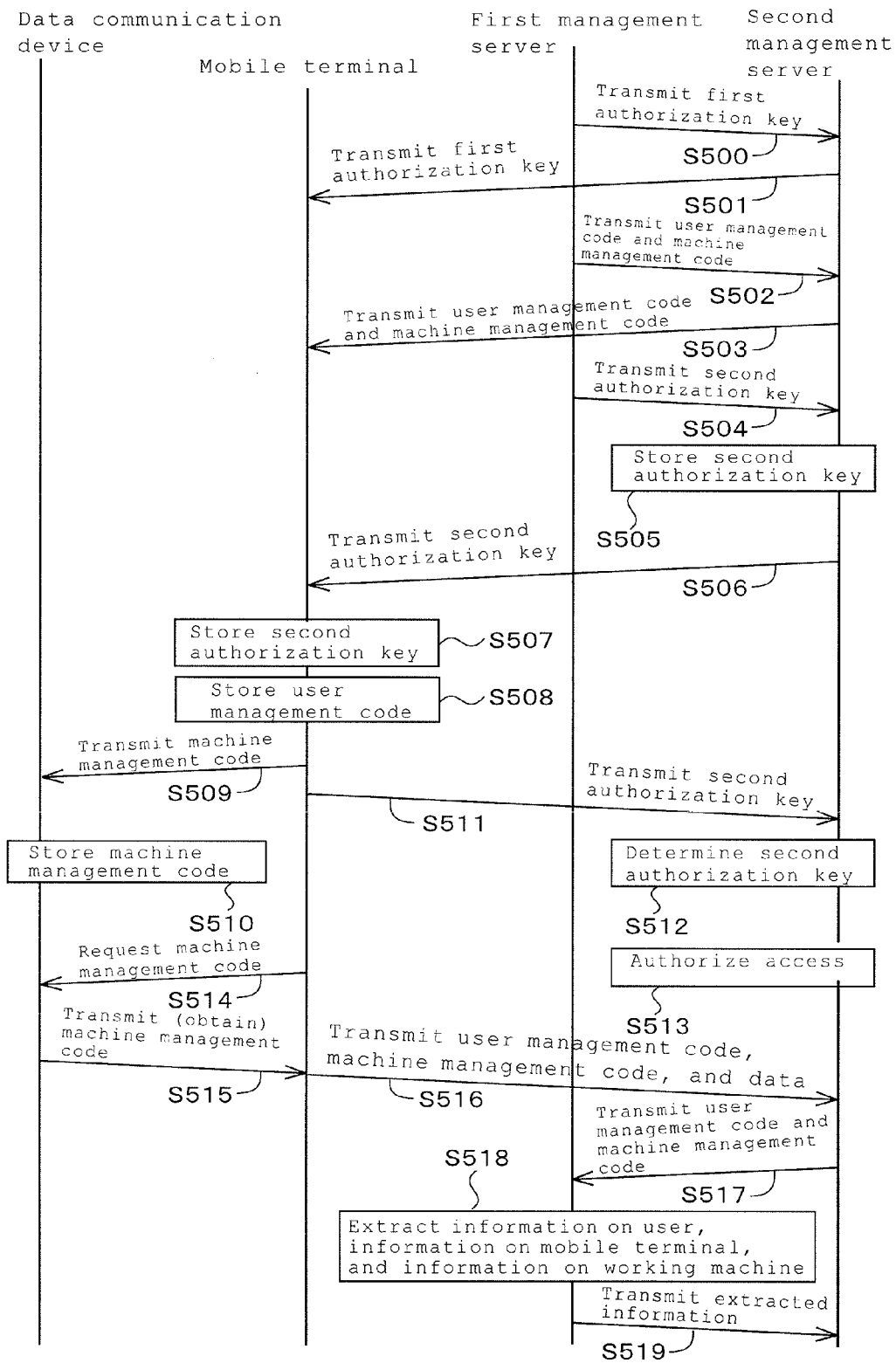
FIG. 11 is a diagram showing an operational flow of the data communication system for working machine in the second modification example.

FIG. 11 is a diagram illustrating the operation of the data communication device, the mobile terminal, the first management server, and the second management server in the data communication system for working machine 10c. FIG. 11 shows the operation (processing) after the issue of the first authorization key from the first management server 50a, 50b. Processing before the issue of the first authorization key from the first management server 50a, 50b is the same as the processing of S200 to S405 in FIG. 6, except that information is outputted from the mobile terminal 40a, 40b to the first management server 50a, 50b via the second management server 71, and thus description thereof is omitted. That is, in the second modification example, in the processing of S200 to S405 in FIG. 6 between the mobile terminal 40a, 40b and the first management server 50a, 50b, transmission of the user ID and the password, request of the mobile terminal identification information and the working machine identification information, and transmission of the mobile terminal identification information and the working machine identification information are made between the mobile terminal 40a, 40b and the first management server 50a, 50b via the second management server 71, not directly, which represents the operation before issue of the first authorization key in the second modification example.

As shown in FIG. 11, upon completion of the issue of the first authorization key, the first management server 50a, 50b outputs the first authorization key to the second management server 71 (step S500). When receiving the first authorization key, the second management server 71 transmits (outputs) the first authorization key to the mobile terminal 40a, 40b that receives the first authorization key (step S501).

The first management server 50a, 50b also transmits the user management code related to the user who owns the mobile terminal 40a, 40b receiving the first authorization key and the machine management code related to the mobile terminal 40a, 40b (machine management code related to the user management code), to the second management server 71 (step S502). The second management server 71 transmits the user management code and the machine management code to the mobile terminal 40a, 40b (step S503).

Further, the first management server 50a, 50b transmits the second authorization key to the second management server 71 (step S504). When receiving the second authorization key, the second management server 71 saves the second authorization key (step S505), and transmits the second authorization key to the mobile terminal 40a, 40b (step S506). When the first management server 50a, 50b issues the second authorization key, the issued second authorization key may be saved in the first management server 50a, 50b instead of the second management server 71. In this case, at authentication of the second authorization key, the second management server 71 may inquire the first management server 50a, 50b about the second authorization key.

When receiving the second authorization key and the user management code, the mobile terminal 40a, 40b stores the received second authorization key (step S507), and also stores the user management code (step S508).

When receiving the machine management code, the mobile terminal 40a, 40b transmits the machine management code to the data communication device 30 (step S509). When receiving the machine management code, the data communication device 30 stores the machine management code (step S510).

Next, when data of the mobile terminal 40a, 40b is saved in the second management server 71 (working machine information database 70), the mobile terminal 40a, 40b transmits the second authorization key saved in the mobile terminal to the second management server 71 (step S511). When receiving the second authorization key transmitted from the mobile terminal 40a, 40b, the second management server 71 determines whether or not the second authorization key corresponding to the mobile terminal 40a, 40b is stored (step S512). In the case where the second authorization key is stored, the second management server 71 authorizes an access of the mobile terminal 40a, 40b to the working machine information database 70 (connection authorization) (step S513).

After the authorization of the access of the mobile terminal 40a, 40b to the working machine information database 70 (log-in authorization), the mobile terminal 40a, 40b requests the machine management code to the data communication device 30 (step S514). When obtaining the machine management code from the data communication device 30 (step S515), the mobile terminal 40a, 40b transmits the user management code saved in the mobile terminal, the obtained machine management code, and data to the second management server 71 (step S516). When obtaining the user management code, the machine management code, and the data, the second management server 71 relates them to one another as shown in FIG. 10, and saves them in the working machine information database 70.

By access of the mobile terminal 40a, 40b to the second management server 71, data related to the user management code and the machine management code can be saved in the working machine information database 70.

As shown in FIG. 10, since the user management code saved in the working machine information database 70 is encoded information on the user (for example, numeric value, symbolic code), identification, name, address, and phone number of the user cannot be recognized by direct viewing of the user management code. By using encoded information on the working machine (for example, numeric value, symbolic code) as the machine management code saved in the working machine information database 70, type, serial number and model of the working machine, and serial number of the data communication device cannot be recognized by direct viewing of the machine management code, which is preferable.

In summary, data related to the user management code that is encoded information on the user and information on the mobile terminal and the machine management code that is encoded information on the working machine is saved in the working machine information database 70, thereby ensuring the confidentiality of the information.

To visually check the data saved in the working machine information database 70 on which user or which working machine, the second management server 71 transmits the user management code and the machine management code to the first management server 50a, 50b (step S517). When receiving the user management code and the machine management code from the second management server 71, the first management server 50a, 50b extracts information on the user corresponding to the user management code (for example, name and address of the user), information on the mobile terminal (for example, phone number), and information on the working machine (serial number of the working machine, serial number of the data communication device, and so on) by using the management data table (step S518), and transmits the extracted various information to the second management server 71 (step S519).

By coordinating the user management database 60 of the first management server 50a, 50b and the working machine information database 70 of the second management server 71, data on the working machine, which is collected via the data communication device 30, can be managed to be related to the user and the machine (working machine and equipment attached to the working machine). Further, the data saved in the working machine information database 70 can be organized to be used for, for example, work plans and work reports in agricultural tasks and maintenance of working machines.

[Second Embodiment]

In a second embodiment, even when the mobile terminal identification information outputted from the mobile terminal 40a, 40b (outputted mobile information) is registered in the user management database 60, the outputted working machine information corresponding to the outputted mobile information can be additionally registered. The registration unit 52 in the above-mentioned first management server 50a, 50b performs the additional registration of the outputted working machine information. A difference between the first embodiment and the second embodiment in configuration will be described. Other configuration is the same as that in the first embodiment.

For example, as shown in FIG. 12 (a), in the state where the mobile terminal identification information and the working machine identification information are stored, it is assumed that the outputted mobile information "012-3456-7890" is outputted to the first management server 50a, 50b, and the outputted working machine information "20112, M115A" is outputted to the first management server 50a, 50b. In this case, although the outputted mobile information "012-3456-7890" is stored in the user management database 60 as the stored mobile information, the outputted working machine information "20112, M115A" is not stored. That is, although "012-3456-7890" is registered in the user management database 60, "20112, M115A" is not registered in the user management database 60.

Only when the first authorization key is issued to the outputted mobile information "012-3456-7890", as shown in FIG. 12(b), the registration unit 52 saves the outputted mobile information "012-3456-7890" to be related to the outputted working machine information "20112, M115A", relates the "012-3456-7890", "20112, M115A", and the first authorization key to one another, and additionally registers "20112, M115A" in the user management database 60.

According to the present invention, even when the data communication device 30 is additionally attached to the working machine, if the data communication device and the mobile terminal 40a, 40b are present, data on the working machine can be easily obtained by the newly added data communication device. For example, the data communication device can be temporarily added for maintenance of the working machine, and data for maintenance can be obtained by the added data communication device.

[Third Embodiment]

In a third embodiment unlike the second embodiment, in the case where the working machine identification information outputted from the mobile terminal 40a, 40b (outputted working machine information) is registered in the user management database 60, the outputted mobile information corresponding to the outputted working machine information can be additionally registered. The registration unit 52 in the first management server 50a, 50b performs the additional registration of the outputted mobile information. A difference between the above-mentioned embodiments and the third embodiment in configuration will be described. Other configurations are the same as that in the above-mentioned embodiments.

For example, as shown in FIG. 13 (a), in the state where the mobile terminal identification information and the working machine identification information are stored, it is assumed that the outputted mobile information "012-9472-3000" is outputted to a first management server 50c, and the outputted working machine information "10006, M135A" is outputted to the first management server 50c. In this case, the outputted mobile information "012-9472-3000" is not stored in the user management database 60 as the stored mobile information, while the outputted working machine information "10006, M135A" is stored. That is, although "10006, M135A" is registered in the user management database 60, "012-9472-3000" is not registered in the user management database 60.

Only when the first authorization key is issued to the outputted working machine information "10006, M135A", as shown in FIG. 13 (b), the registration unit 52 saves the outputted mobile information "012-9472-3000" and the outputted working machine information "10006, M135A" to be related to each other, relates "012-9472-3000", "10006, M135A", and the first authorization key with one another, and additionally registers "012-9472-3000" in the user management database 60.

According to the present invention, even when the mobile terminal is related to the data communication device (working machine), data can be easily obtained from the data communication device by using the added mobile terminal. For example, data can be obtained using a mobile terminal of a service technician of the working machine. In the case where a plurality of operators use one working machine, data can be obtained using the mobile terminal of each operator.

The data communication device 30 needs to obtain data relating to the working machine, and preferably, the data communication device 30 automatically collects and stores various data (data on tractor 1) while the working machine (for example, tractor 1) is operating.

For example, when a cultivator as the operating unit 9 is coupled to the rear part of the tractor 1 and the tractor 1 operates, data including rotary rotation number, rotary loads, engine rotation number, vehicle speed, and plowing depth is outputted to the vehicle communication network, and the data communication device 30 obtains the data including rotary rotation number, rotary loads, engine rotation number, vehicle speed, and plowing depth via the vehicle communication network.

In the case where the operating unit 9 is a fertilizer distributor, an agrichemical distributor, or a seed distributor, data including vehicle speed, engine rotation number, and distribution amount (fertilizer distribution amount, agrichemical distribution amount, seed distribution amount) is outputted to the vehicle communication network, and the data communication device 30 obtains vehicle speed, engine rotation number, fertilizer distribution amount, agrichemical distribution amount, and seed distribution amount. Alternatively, in the case where the operating unit 9 is a harvest machine, data including vehicle speed, engine rotation number, and harvest amount is outputted to the vehicle communication network, and the data communication device 30 obtains vehicle speed, engine rotation number, and harvest amount.

The collected data is stored in the data communication device 30. Preferably, after establishment of the pairing between the data communication device 30 and the mobile terminal 40a, 40b (after transmission authorization of data), the data stored in the data communication device 30 is outputted to the mobile terminal 40a, 40b. In the case where the data communication device 30 is attached to an agricultural machine such as tractor, combine harvester, or rice planting machine to which the operating unit 9 is attached, work data on agricultural tasks performed by the agricultural machine can be obtained.

[Fourth Embodiment]

Figure 14:
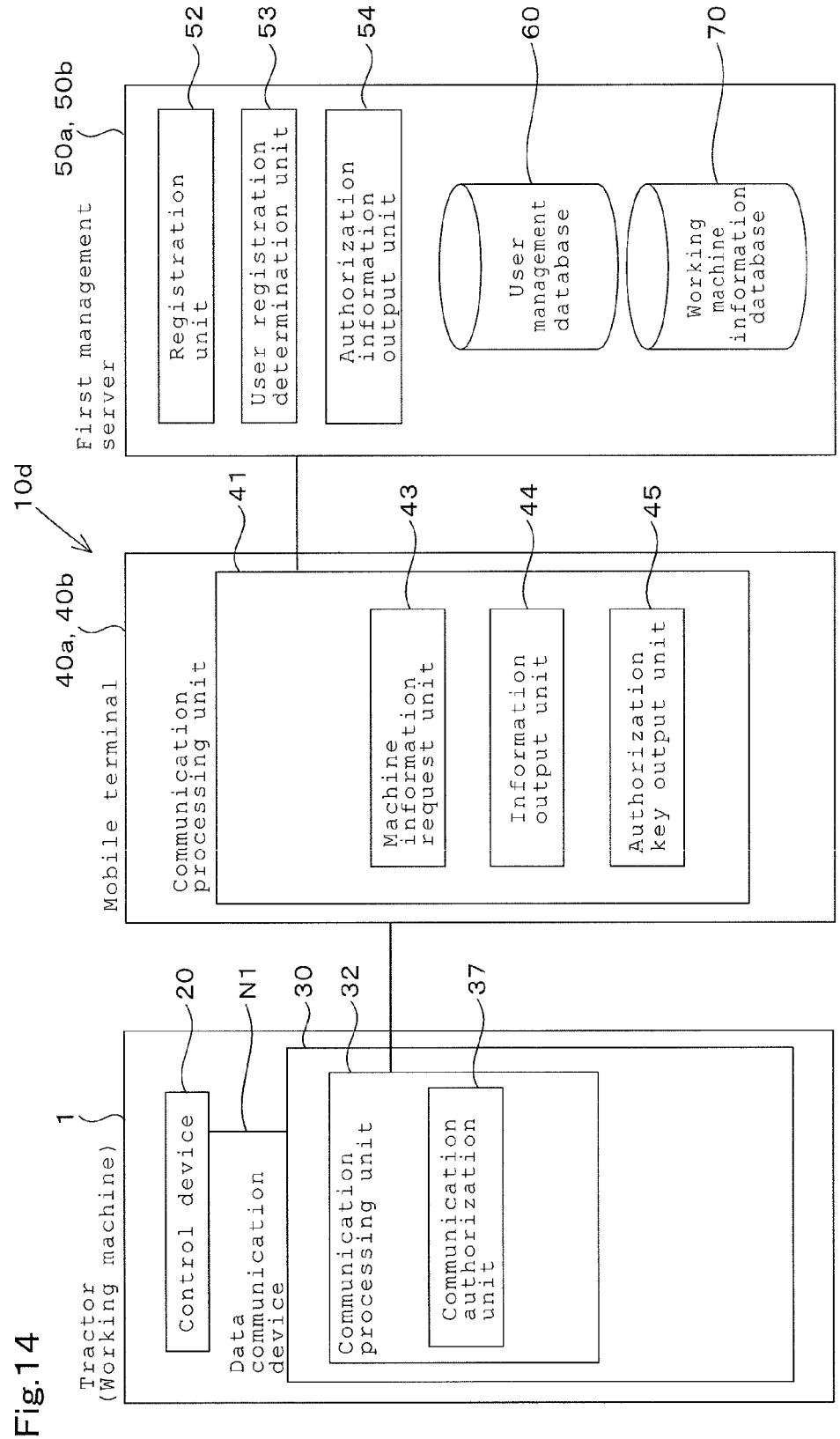
FIG. 14 is a diagram showing a configuration of a data communication system for working machine in a fourth embodiment.

In the second modification example, the user management code, the machine management code, and the data obtained by the mobile terminal 40a, 40b are saved in the working machine information database 70 of the second management server 71, which is provided separately from the first management server 50a, 50b. However, in the data communication system for working machine in a fourth embodiment, as shown in FIG. 14, the user management code, the machine management code, and the data obtained by the mobile terminal 40a, 40b is saved in the working machine information database 70 provided in the first management server 50a, 50b.

As in FIG. 9, in the working machine information database 70 provided in the first management server 50a, 50b, the user management code is assigned in accordance with information on the user and information on the mobile terminal, and the machine management code is assigned in accordance with information on the working machine. The working machine information database 70 saves the management data table for extracting the information on the user, the information on the mobile terminal, and the information on the working machine on the basis of the user management code and the machine management code.

Figure 15:
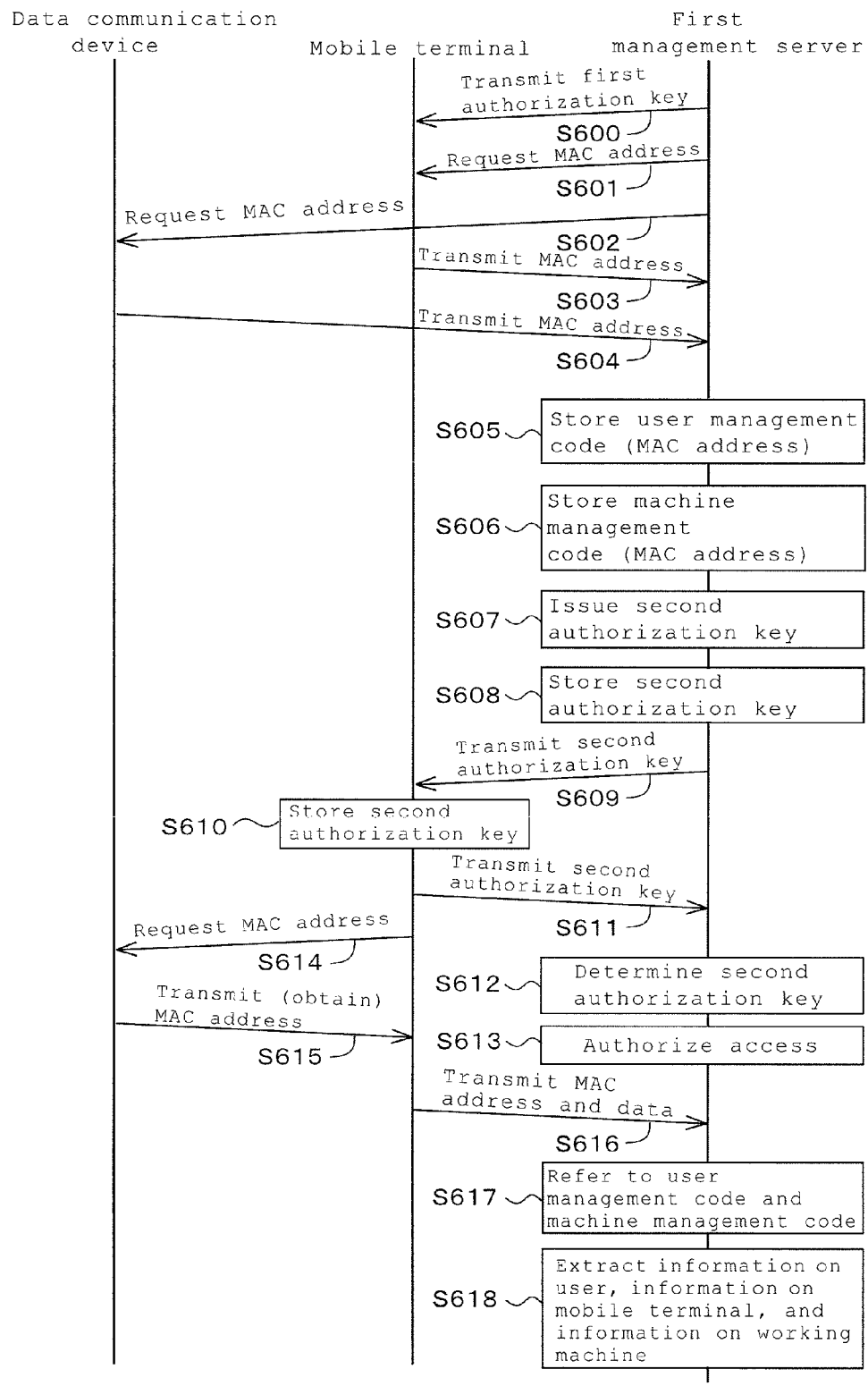
FIG. 15 is a diagram showing an operational flow of the data communication system for working machine in the fourth embodiment.

FIG. 15 is a diagram illustrating the operation of a data communication system for working machine in the fourth embodiment. Description of the same operation (processing) as in the above-mentioned embodiments is omitted.

As shown in FIG. 15, upon completion of issue of the first authorization key, the first management server 50a, 50b outputs the first authorization key to the mobile terminal 40a, 40b (step S600). Further, the first management server 50a, 50b request a MAC address of the mobile terminal 40a, 40b (physical address on the network, which is assigned to the mobile terminal 40a, 40b) to the mobile terminal 40a, 40b receiving the first authorization key (step S601).

The first management server 50a, 50b further requests the MAC address of the data communication device 30 (physical address on the network, which is assigned to the data communication device 30) to the data communication device 30 to which the mobile terminal 40a, 40b receiving the first authorization key is connected, via the mobile terminal 40a, 40b (step S602).

The mobile terminal 40a, 40b transmits its own MAC address to the first management server 50a, 50b in response to the request for the MAC address from the first management server 50a, 50b (step S603). The data communication device 30 transmits its own MAC address to the first management server 50a, 50b via the mobile terminal 40a, 40b in response to the request for the MAC address from the first management server 50a, 50b (step S604).

In the case where the first management server 50a, 50b can obtain the MAC address of the mobile terminal 40a, 40b and the MAC address of the data communication device 30 when the mobile terminal 40a, 40b accesses the first management server 50a, 50b, the processing in the step S601 to step S604 may be omitted.

When obtaining the MAC address of the mobile terminal 40a, 40b, the first management server 50a, 50b sets the MAC address of the mobile terminal 40a, 40b to the user management code, and stores the user management code in the user management database 60 (step S605). When obtaining the MAC address of the data communication device 30, the first management server 50a, 50b sets the MAC address of the data communication device 30 to the machine management code, and stores the machine management code in the user management database 60 (step S606).

After outputting of the first authorization key, the first management server 50a, 50b issues the second authorization key for the access to the working machine information database 70 (step S607), and stores the second authorization key in the first management server 50a, 50b (step S608). The first management server 50a, 50b transmits the second authorization key to the mobile terminal 40a, 40b (step S609). When receiving the second authorization key, the mobile terminal 40a, 40b stores the second authorization key (step S610).

Next, in the case where data of the mobile terminal 40a, 40b is saved in the working machine information database 70, the mobile terminal 40a, 40b transmits the second authorization key saved in the mobile terminal 40a, 40b to the first management server 50a, 50b (step S611). When receiving the second authorization key transmitted from the mobile terminal 40a, 40b, the first management server 50a, 50b determines whether or not the second authorization key corresponding to the mobile terminal 40a, 40b is stored (step S612), and when the second authorization key is stored, the first management server 50a, 50b authorizes an access of the mobile terminal 40a, 40b to the working machine information database 70 (connection authorization) (step S613).

After the authorization of the access of the mobile terminal 40a, 40b to the working machine information database 70 (log-in authorization), the mobile terminal 40a, 40b requests the MAC address (machine management code) to the data communication device 30 (step S614). Then, when obtaining the MAC address (machine management code) of the data communication device 30 (step S615), the mobile terminal 40a, 40b transmits the own MAC address (the user management code), the MAC address of the data communication device 30 (machine management code), and data to the first management server 50a, 50b (step S616). When obtaining the user management code, the machine management code, and the data, as in FIG. 10, the first management server 50a, 50b relates them to one another, and saves them in the working machine information database 70.

In the case where the data saved in the working machine information database 70 is visually checked on data of which user and which machine, the first management server 50a, 50b refers to the user management code and the machine management code in the user management database 60 (step S617), and extracts the information on the user corresponding to the user management code, the information on the mobile terminal, and the information on the working machine (the serial number of the working machine, the serial number of the data communication device, and so on) on the basis of the referred user management code and machine management code, and the management data table (step S618).

According to the present invention, since the unique MAC address is used as the user management code and the machine management code, the user and the machine can be easily managed, and the database and further, the communication processing can be simplified.

It should be considered that the disclosed embodiments are illustrative in all points, and are not limitative. The scope of the present invention is defined by the claims of the invention rather than the description, and includes all modifications in equivalents of the claims of the invention. Although the above-mentioned embodiments use the tractor that is a type of working machine as an example, the working machine is not limited to working machines including tractor, combine harvester, and rice planting machine, and may be construction machines such as backhoe.

REFERENCE SIGNS LIST

1: Working machine (tractor)
2: Travelling vehicle (travelling car body)
3: Engine
4: Transmission
5: Three-point link mechanism
7: Cabin
8: Driver's seat
9: Operating unit
10a to 10d: Data communication system for working machine
20: Control device
30: Data communication device
32: Communication processing unit
37: Communication authorization unit
40a, 40b: Mobile terminal
41: Communication processing unit
43: Machine information request unit
44: Information output unit
45: Authorization key output unit
50a: First management server
52: Registration unit
53: User registration determination unit
54: Authorization information output unit
60: User management database
70: Working machine information database
71: Second management server

The invention claimed is:

1. A data communication system for a working machine, comprising:
a data communication device configured to obtain data relating to the working machine;
a mobile terminal configured to receive the data of the data communication device by wireless communication; and
a management server configured to output an authorization key for wireless communication between the data communication device and the mobile terminal, wherein
the mobile terminal includes:
an information output logic configured to output, to the management server, a mobile terminal identification information and a working machine identification information, the mobile terminal identification information identifying the mobile terminal, the working machine identification information identifying the working machine; and
an authorization key output logic configured to output, to the data communication device, the authorization key outputted from the management server,
the management server includes:
a user management database configured to register the mobile terminal identification information relating to the mobile terminal and the working machine identification information relating to a sold working machine and to relate the mobile terminal identification information and the working machine identification information to each other;
a user registration determination logic configured to determine whether or not the mobile terminal and the working machine are registered to be related to each other on the basis of the mobile terminal identification information and the working machine identification information each outputted from the mobile terminal and of the mobile terminal identification information and the working machine identification information each stored in the user management database; and
an authorization information output logic configured to output the authorization key necessary for wireless communication between the mobile terminal and the working machine when the user registration determination logic determines that the mobile terminal and the working machine are registered to be related to each other, and the data communication device includes
a communication authorization logic configured to authenticate the authorization key outputted from the mobile terminal with an authorization key previously stored in the communication authorization logic to determine validation of the authorization key outputted from the mobile terminal, and to authorize wireless communication between the data communication device and the mobile terminal when determining validation of the authorization key outputted from the mobile terminal.

2. The data communication system for a working machine according to claim 1, wherein
the management server includes
a registration logic configured to register, in the user management database, the mobile terminal identification information and the working machine identification information each outputted from the mobile terminal, to relate the mobile terminal identification information and the working machine identification information to each other, and to issue the authorization key, and
the user registration determination logic determines, upon issue of the authorization key from the registration logic, that the mobile terminal and the working machine corresponding to the authorization key are registered to be related to each other.

3. The data communication system for a working machine according to claim 2, wherein
the registration logic registers the outputted working machine identification information in addition to the mobile terminal identification information in a case where: the mobile terminal identification information outputted from the mobile terminal is already registered in the user management database; and the working machine identification information outputted from the mobile terminal is not registered, in the user management database, not to be related to the mobile terminal identification information outputted from the mobile terminal.

4. The data communication system for a working machine according to claim 3, wherein
the registration logic registers the outputted mobile terminal identification information in addition to the working machine identification information in a case where: the working machine identification information outputted from the mobile terminal is registered in the user management database; and the mobile terminal identification information outputted from the mobile terminal is not registered to be related to the working machine identification information outputted from the mobile terminal in the user management database.

5. The data communication system for a working machine according to claim 3, wherein
the mobile terminal includes
a machine information request logic configured to request the working machine identification information to the data communication device, and
the information output logic outputs, after obtaining the working machine identification information, the working machine identification information and the mobile terminal identification information to the management server on the basis of the request from the machine information request logic.

6. The data communication system for a working machine according to claim 5, wherein
the machine information request logic requests the working machine identification information to the data communication device after: transmission of a network key from the mobile terminal to the data communication device; and establishment of the authentication for wireless communication between the mobile terminal and the data communication device on the basis of the network key.

7. A data communication system for a working machine, comprising:
a data communication device configured to obtain data relating to the working machine;
a mobile terminal configured to receive the data of the data communication device by wireless communication;
a first management server configured to include a user management database, the user management database registering and relating the mobile terminal of a user and the working machine sold to the user each other; and
a second management server configured to include a working machine information database, the working machine information database obtaining the data obtained by the data communication device via the mobile terminal and storing the obtained data, wherein
the first management server outputs, to the second management server, a first authorization key for determining whether or not wireless communication between the data communication device and the mobile terminal is performed, and outputs, to the second management server, a second authorization key for determining whether or not the mobile terminal is connected to the working machine information database in a case where the mobile terminal owned by the user is related to the working machine owned by the user in the user management database, and
the second management server outputs the first authorization key to the mobile terminal, the first authorization key being received from the first management server, and outputs the second authorization key to the mobile terminal, the second authorization key being received from the first management server.

8. The data communication system for a working machine according to claim 7, wherein
the user management database stores a user management code for management of the user and a machine management code for management of at least the working machine and relates the user management code and the machine management code to the mobile terminal and the working machine, and
the mobile terminal outputs data obtained from the data communication device, the user management code, and the machine management code to the working machine information database after connecting to the working machine information database on the basis of the second authorization key.

9. The data communication system for a working machine according to claim 8, wherein
the user management database has a management data table for extracting relation at least between the working machine and the mobile terminal on the basis of the user management code and the machine management code.

10. The data communication system for a working machine according to claim 9, wherein
the mobile terminal transmits a physical address on a network, the physical address being assigned to the mobile terminal as the user management code, to the user management database via the first management server, and
the data communication device transmits a physical address on a network, the physical address being assigned to the data communication device as the machine management code, to the user management database via the mobile terminal and the first management server.

11. The data communication system for a working machine according to claim 9, wherein
the mobile terminal includes
an authorization key output logic configured to output the first authorization key to the data communication device, and
the data communication device includes
a communication authorization logic configured to authenticate the first authorization key outputted from the mobile terminal with the first authorization key previously stored in the data communication device to determine validation of the first authorization key outputted from the mobile terminal, and transmits the data between the data communication device and the mobile terminal when determining validation of the first authorization key outputted from the mobile terminal.

12. The data communication system for a working machine according to claim 9, wherein
the mobile terminal transmits the second authorization key to the first management server, and the first management server receives the second authorization key transmitted from the mobile terminal, determines whether or not the second authorization key corresponding to the mobile terminal is stored, and authorizes the mobile terminal to access the working machine information database when it is determined that the second authorization key is stored.

13. The data communication system for a working machine according to claim 2 wherein
the registration logic registers the outputted mobile terminal identification information in addition to the working machine identification information in a case where: the working machine identification information outputted from the mobile terminal is registered in the user management database; and the mobile terminal identification information outputted from the mobile terminal is not registered to be related to the working machine identification information outputted from the mobile terminal in the user management database.

14. The data communication system for a working machine according to claim 1, wherein
the mobile terminal includes
a machine information request logic configured to request the working machine identification information to the data communication device, and
the information output logic outputs, after obtaining the working machine identification information, the working machine identification information and the mobile terminal identification information to the management server on the basis of the request from the machine information request logic.

15. The data communication system for a working machine according to claim 2, wherein
the mobile terminal includes
a machine information request logic configured to request the working machine identification information to the data communication device, and
the information output logic outputs, after obtaining the working machine identification information, the working machine identification information and the mobile terminal identification information to the management server on the basis of the request from the machine information request logic.

16. The data communication system for a working machine according to claim 14, wherein
the machine information request logic requests the working machine identification information to the data communication device after: transmission of a network key from the mobile terminal to the data communication device; and establishment of the authentication for wireless communication between the mobile terminal and the data communication device on the basis of the network key.

17. The data communication system for a working machine according to claim 15, wherein
the machine information request logic requests the working machine identification information to the data communication device after: transmission of a network key from the mobile terminal to the data communication device; and establishment of the authentication for wireless communication between the mobile terminal and the data communication device on the basis of the network key.

18. The data communication system for a working machine according to claim 8, wherein
the mobile terminal transmits a physical address on a network, the physical address being assigned to the mobile terminal as the user management code, to the user management database via the first management server, and
the data communication device transmits a physical address on a network, the physical address being assigned to the data communication device as the machine management code, to the user management database via the mobile terminal and the first management server.

19. The data communication system for a working machine according to claim 7, wherein
the mobile terminal includes
an authorization key output logic configured to output the first authorization key to the data communication device, and
the data communication device includes
a communication authorization logic configured to authenticate the first authorization key outputted from the mobile terminal with the first authorization key previously stored in the data communication device to determine validation of the first authorization key outputted from the mobile terminal, and transmits the data between the data communication device and the mobile terminal when determining validation of the first authorization key outputted from the mobile terminal.

20. The data communication system for a working machine according to claim 8, wherein
the mobile terminal includes
an authorization key output logic configured to output the first authorization key to the data communication device, and
the data communication device includes
a communication authorization logic configured to authenticate the first authorization key outputted from the mobile terminal with the first authorization key previously stored in the data communication device to determine validation of the first authorization key outputted from the mobile terminal, and transmits the data between the data communication device and the mobile terminal when determining validation of the first authorization key outputted from the mobile terminal.

21. The data communication system for a working machine according to claim 7, wherein
the mobile terminal transmits the second authorization key to the first management server, and the first management server receives the second authorization key transmitted from the mobile terminal, determines whether or not the second authorization key corresponding to the mobile terminal is stored, and authorizes the mobile terminal to access the working machine information database when it is determined that the second authorization key is stored.

22. The data communication system for a working machine according to claim 8, wherein
the mobile terminal transmits the second authorization key to the first management server, and the first management server receives the second authorization key transmitted from the mobile terminal, determines whether or not the second authorization key corresponding to the mobile terminal is stored, and authorizes the mobile terminal to access the working machine information database when it is determined that the second authorization key is stored.

* * * * *